(12) United States Patent
Nakamura et al.

(10) Patent No.: US 8,340,087 B2
(45) Date of Patent: Dec. 25, 2012

(54) STORAGE SUBSYSTEM

(75) Inventors: Shuji Nakamura, Machida (JP); Akira Fujibayashi, Sagamihara (JP); Mutsumi Hosoya, Odawara (JP); Hideaki Fukuda, Odawara (JP)

(73) Assignee: Hitachi, Ltd., Tokyo (JP)

( * ) Notice: Subject to any disclaimer, the term of this patent is extended or adjusted under 35 U.S.C. 154(b) by 64 days.

(21) Appl. No.: 12/888,268

(22) Filed: Sep. 22, 2010

(65) Prior Publication Data

US 2011/0013625 A1 Jan. 20, 2011

Related U.S. Application Data

(63) Continuation of application No. 12/020,216, filed on Jan. 25, 2008, now Pat. No. 7,817,626.

(30) Foreign Application Priority Data

Dec. 27, 2007 (JP) ................................ 2007-336864

(51) Int. Cl.
*H04L 12/50* (2006.01)

(52) U.S. Cl. ........ 370/360; 370/351; 370/357; 370/389; 370/395.1; 370/395.7; 709/208; 709/209; 709/210; 709/211; 709/217; 709/218; 709/219; 711/100; 711/101; 711/111; 711/114; 711/119; 711/147; 711/148; 711/149; 711/150

(58) Field of Classification Search .......... None
See application file for complete search history.

(56) References Cited

U.S. PATENT DOCUMENTS

| | | | |
|---|---|---|---|
| 6,349,357 B1 * | 2/2002 | Chong, Jr. ...................... | 711/111 |
| 6,850,997 B1 * | 2/2005 | Rooney et al. .................. | 710/38 |
| 2002/0007445 A1 * | 1/2002 | Blumenau et al. ............ | 711/153 |
| 2003/0005202 A1 * | 1/2003 | Bakke et al. .................. | 710/305 |
| 2003/0023749 A1 | 1/2003 | Lee et al. | |
| 2003/0229757 A1 | 12/2003 | Hosoya et al. | |
| 2005/0120173 A1 | 6/2005 | Minowa | |
| 2007/0005885 A1 * | 1/2007 | Kobayashi et al. ........... | 711/114 |

FOREIGN PATENT DOCUMENTS

| | | |
|---|---|---|
| JP | 2002-344463 A | 11/2002 |
| JP | 2003-30166 A | 1/2003 |
| JP | 2003-345512 A | 12/2003 |
| JP | 2004-246439 A | 9/2004 |
| JP | 2006-122952 A | 5/2006 |

OTHER PUBLICATIONS

Japanese Office Action corresponding to Japanese Patent Application No. 2007-336864, dated Apr. 13, 2010.
European Search Report corresponding to European Patent Application No. 08251530.5, dated Apr. 29, 2010.

* cited by examiner

*Primary Examiner* — Michael J Moore, Jr.
*Assistant Examiner* — Gautam Sharma
(74) *Attorney, Agent, or Firm* — Sughrue Mion, PLLC

(57) ABSTRACT

Deadlock is avoided in a grid storage system having superior scalability. Provided is a storage subsystem connected to a host computer for receiving a write or read access from the host computer. This storage subsystem includes a plurality of modules respectively having a storage resource, a switch for connecting the plurality of modules, a controller for controlling the transfer of a packet based on the write or read access from the host computer to a target module among the plurality of modules via the switch, and a memory storing a transfer rule of the packet. The controller controls the transfer of the packet based on the transfer rule.

6 Claims, 47 Drawing Sheets

| PACKET TYPE SECTION | DESTINATION ADDRESS SECTION | SOURCE ADDRESS SECTION | DATA LENGTH SECTION | (DATA SECTION) | CHECK CODE SECTION |
|---|---|---|---|---|---|

(2)

| DESTINATION ADDRESS SECTION | | |
|---|---|---|
| SW# | COMPONENT | COMPONENT INTERNAL ADDRESS |

| PORT # | DESTINATION | SENDABLE PACKET TYPE |
|---|---|---|
| 0 | CHA0 | REPLY |
| 1 | MP0 | REPLY |
| 2 | DKA0 | REPLY |
| 3 | CM0 | COMMAND |
| 4 | SW3 | REPLY |
| 5 | SW1 | COMMAND |

FIG.19

| DESTINATION ADDRESS | | TRANSFER PORT# |
|---|---|---|
| SW# | COMPONENT | |
| 0 | CHA0 | 0 |
| | DKA0 | 2 |
| | MP0 | 1 |
| | CM0 | 3 |
| OTHER THAN 0 (OTHER SW) | * | 5 |

FIG.21

(1)
READ REQUEST MESSAGE

| MESSAGE | | temp | | MSG TYPE = RD REQUEST | REQUESTED DATA |
|---|---|---|---|---|---|
| to | from | to | from | | LDEV,LBA,LEN |

(2)
READ REPLY MESSAGE

| MESSAGE | | temp | | MSG TYPE = RD REPLY | DATA EXISTING ADDRESS |
|---|---|---|---|---|---|
| to | from | to | from | | CM#,ADR,LEN |

(3)
WRITE REQUEST MESSAGE

| MESSAGE | | temp | | MSG TYPE = WR REQUEST | REQUESTED DATA | DATA EXISTING ADDRESS |
|---|---|---|---|---|---|---|
| to | from | to | from | | LDEV,LBA,LEN | CM#,ADR,LEN |

(4)
WRITE REPLY MESSAGE

| MESSAGE | | temp | | MSG TYPE = WR REPLY | REQUESTED DATA |
|---|---|---|---|---|---|
| to | from | to | from | | LDEV,LBA,LEN |

(5)
COPY COMPLETION MESSAGE

| temp | | MSG TYPE = COPY COMPLETION | DATA EXISTING ADDRESS |
|---|---|---|---|
| to | from | | CM#,ADR,LEN |

FIG.22

| LDEV# | LBA | SW#,MP#,DKA# |
|---|---|---|
| 0 | 0x00000000~0x1fffffff | 0,0,0 |
| 0 | 0x20000000~0x3fffffff | 0,0,1 |
| ... | ... | ... |
| 5 | 0x00000000~0x1fffffff | 3,0,0 |
| 6 | 0x00000000~0x1fffffff | UNALLOCATED |
| ... | ... | ... |
| n | 0x00000000~0x7fffffff | 3,0,0 |

FIG.23

| PDEV# (HDD#) | LDEV | LBA | CONTROL METHOD |
|---|---|---|---|
| 0 | 0 | 0x00000000~0x1fffffff | RAID1 |
| 1 | | | |
| 2 | 23 | 0x00000000~0x5fffffff | RAID5 |
| 3 | | | |
| 4 | | | |
| 5 | | | |
| 6 | 211 | 0x80000000~0x9fffffff | RAID10 |
| 7 | | | |
| 8 | | | |
| 9 | | | |
| 10 | — | UNALLOCATED | — |
| ... | | | |
| m | | | |

FIG.26

MESSAGE TRANSFER DESTINATION TABLE

| FINAL DESTINATION | TRANSFER DESTINATION | REMAINING HOP COUNT |
|---|---|---|
| MP0 | --- | 0 |
| MP1 | MP1 | 0 |
| MP2 | MP1 | 1 |
| MP3 | MP1 | 2 |
| ... | ... | ... |
| MPn | MPn | 0 |

FIG.36

| COMPONENT | CONNECTION SWITCH | |
|---|---|---|
| | REDUNDANT SYSTEM A | REDUNDANT SYSTEM B |
| CMA1 | SW1A | SW1B |
| CMA2 | SW2A | SW2B |
| CMA3 | SW3A | SW3B |
| CMA4 | SW4A | SW4B |
| ... | ... | ... |
| CHA1 | SW1A | SW2B |
| CHA2 | SW2A | SW1B |
| CHA3 | SW3A | SW4B |
| CHA4 | SW4A | SW3B |
| ... | ... | ... |

FIG.37

| ORIGIN SW | TOLERABLE HOP COUNT BETWEEN SWITCHES |
|---|---|
| SW1A | 2 |
| SW2A | 1 |
| SW3A | 2 |
| SW4A | 1 |
| ... | ... |
| SW1B | 1 |
| SW2B | 2 |
| SW3B | 1 |
| SW4B | 2 |
| ... | ... |

FIG.38

| SOURCE SW | DESTINATION SW | NEXT SW | HOP COUNT BETWEEN SWITCHES | REDIRECT COUNT |
|---|---|---|---|---|
| SW1A | SW1A | --- | 0 | 0 |
| | SW2A | SW2A | 1 | 0 |
| | SW3A | SW2A | 2 | 0 |
| | SW4A | SW2A | 3 | 1 |
| | ... | ... | ... | ... |
| SW2A | SW1A | SW1A | 1 | 0 |
| | SW2A | --- | 0 | 0 |
| | SW3A | SW3A | 1 | 0 |
| | SW4A | SW3A | 2 | 1 |
| | ... | ... | ... | ... |
| SW3A | SW1A | SW4A | 2 | 0 |
| | SW2A | SW4A | 3 | 1 |
| | SW3A | --- | 0 | 0 |
| | SW4A | SW4A | 1 | 0 |
| | ... | ... | ... | ... |
| SW4A | SW1A | SW1A | 1 | 0 |
| | SW2A | SW1A | 2 | 1 |
| | SW3A | SW3A | 1 | 0 |
| | SW4A | --- | 0 | 0 |
| | ... | ... | ... | ... |
| ... | | | | |

FIG.39

| SOURCE | DESTINATION | REDUNDANT SYSTEM BEING USED |
|---|---|---|
| CHA/DKA1 | CMA1 | A |
| | CMA2 | B |
| | CMA3 | A |
| | CMA4 | B |
| | ... | ... |
| CHA/DKA2 | CMA1 | B |
| | CMA2 | A |
| | CMA3 | A |
| | CMA4 | B |
| | ... | ... |
| CHA/DKA3 | CMA1 | A |
| | CMA2 | B |
| | CMA3 | A |
| | CMA4 | B |
| | ... | ... |
| CHA/DKA4 | CMA1 | A |
| | CMA2 | B |
| | CMA3 | B |
| | CMA4 | A |
| | ... | ... |
| ... | | |

STORAGE SUBSYSTEM

CROSS REFERENCES

This is a continuation of application Ser. No. 12/020,216 filed Jan. 25, 2008. The entire disclosure(s) of the prior application(s), application Ser. No. 12/020,216 is hereby incorporated by reference.

This application relates to and claims priority from Japanese Patent Application No. 2007-336864, filed on Dec. 27, 2007, the entire disclosure of which is incorporated herein by reference.

BACKGROUND

The present invention generally relates to a storage subsystem, and in particular relates to a storage subsystem capable of inhibiting the occurrence of a deadlock during packet communication in a network of a storage subsystem.

Efforts have been expended from the past to prevent deadlocks in a computer system. Deadlock is a status where processing of a plurality of packets competes in a communication network of a computer system, the plurality of packets mutually freeze and the processing of packets is suspended.

For instance, Japanese Patent Laid-Open Publication No. 2002-344463 describes an interactive ring network in which node apparatuses connected to a processing unit are connected in a ring shape with an interactively communicable link. In order to facilitate the changing of the routing of the packet, the node apparatus includes a disconnection point recording register for recording at which section in the network the dependence should be disconnected in order to avoid a deadlock, and determines in which direction on the interactive ring network the packet is to be sent based on the register value concerning the packet input from the processing unit.

In addition, Japanese Patent Laid-Open Publication No. 2003-30166 discloses a loosely-coupled multiprocessor system that eliminates a deadlock while preventing the deterioration in the processing efficiency of tasks. This loosely-coupled multiprocessor system comprises a host group for executing a plurality of tasks while sharing a plurality of resources and a deadlock check apparatus. The deadlock check apparatus detects a deadlock that occurs as a result of one task among a plurality of tasks entering a standby status of waiting for one of the resources, and, when a deadlock is detected, selects a resource release task for releasing a locked resource among the plurality of tasks based on the progress of processing of the respective tasks, and the priority set in the respective tasks.

Furthermore, Japanese Patent Laid-Open Publication No. 2004-246439 describes a method for preventing the overall cluster system from stalling due to a deadlock between hosts configuring the cluster system. A timer monitoring means monitors the resource lock wait against the shared resource, the shared resource long-period lock check means checks the host and process that are causing the resource lock wait against the shared resource, coercively stops the process that is causing the resource lock wait against the shared resource and releases the lock of the shared resource secured by the process, coercively stops the host that is operating the process that is causing the resource lock against the shared resource, and purges the resource lock request against the shared resource locked by the host.

SUMMARY

With the conventional example described in Japanese Patent Laid-Open Publication No. 2002-344463, there is a problem in that the management load will increase since the disconnection points across the entire ring network must be managed.

With the conventional example described in Japanese Patent Laid-Open Publication No. 2003-030166, when a deadlock is detected, it is necessary to select a resource release task for releasing the locked resource among the plurality of tasks based on the progress of processing of the respective tasks, and the priority set in the respective tasks. Nevertheless, these processes will become an overhead against the processing of tasks, and this example lacks feasibility particularly when the system is to be equipped with expandability.

Further, with the conventional example described in Japanese Patent Laid-Open Publication No. 2004-246439, when the cluster system is to be applied to an internal network of the storage system, the host computer that issued the command to the storage system will generate a command time-out before the resource lock status is detected, and there is a problem in that the host computer is not able to send the packet to the target node before time-out.

Meanwhile, there is a gird storage system as a storage system capable of enlarging the size of the storage capacity in accordance with the growth of the user's business. This storage system realizes grid architecture capable of expanding the storage resource to be provided to the user by sequentially adding a plurality of relatively small nodes having channel adapters and disk adapters to an internal network of a storage subsystem via a switch.

When a certain node of a storage system receives a request from the host computer, the node that received the request transfers the packet of a read command or a write command to the target node via a switch, and the node that received the packet writes or reads data in and from the cache memory and the storage device. The storage system is thereby able to reply to the host computer.

When the transfer of a plurality of packets in an internal network of a storage subsystem is conducted through a plurality of switches, the nodes of the plurality of packets simultaneously compete for the node path and resources such as the buffer. Here, if the dependence of the resources configures a loop, the foregoing deadlock where processing based on commands from the host computer cannot proceed will occur.

Conventionally, in the field of storage systems having superior scalability such as grid storage systems, no effective proposal has been made for eliminating such deadlock.

Thus, an object of the present invention is to avoid a deadlock in a grid storage system having superior scalability. Another object of the present invention is to provide a storage subsystem capable of preventing the occurrence of a deadlock without requiring any special hardware such as a deadlock detector. A further object of the present invention is to provide a storage subsystem capable of preventing the occurrence of a deadlock without causing any processing overhead and without causing the time-out of the host computer.

In order to achieve the foregoing objects, the present invention provides a transfer rule of packets to prevent the foregoing deadlock in a grid storage system capable of enlarging the size of the storage capacity in accordance with the growth of the user's business, and the transfer of packets in the internal network is controlled based on such transfer rule.

The present invention is able to avoid a deadlock in a grid storage system having superior scalability. In addition, according to the present invention, it is possible to provide a storage subsystem capable of preventing the occurrence of a deadlock without requiring any special hardware such as a deadlock detector.

Moreover, according to the present invention, it is possible to provide a storage subsystem capable of preventing the occurrence of a deadlock without causing any processing overhead and without causing the time-out of the host computer.

DESCRIPTION OF DRAWINGS

FIG. 16 shows a packet frame;

FIG. 19 shows an example of a routing table;

FIG. 21 shows a message format;

FIG. 22 is an LDEV-DKA table;

FIG. 23 is a DKA table showing the correspondence of a PDEV (Physical Device), and an LDEV number with data and a logical address of the LDEV;

FIG. 26 is a message transfer destination table;

FIG. 36 is a connection table showing the connection relationship of the component and switch of a module;

FIG. 37 is a tolerable hop count table for defining the inter-switch tolerable hop count tolerated in the packet;

FIG. 38 is a topology table recording the redirect count based on a source SW, a destination SW, next SW of the destination SW, hop count between the source SW and the destination SW, and the tolerable hop count;

FIG. 39 is a transfer use redundant system table for prescribing the redundant system to be used for transferring the packet;

DETAILED DESCRIPTION

Figure 1:
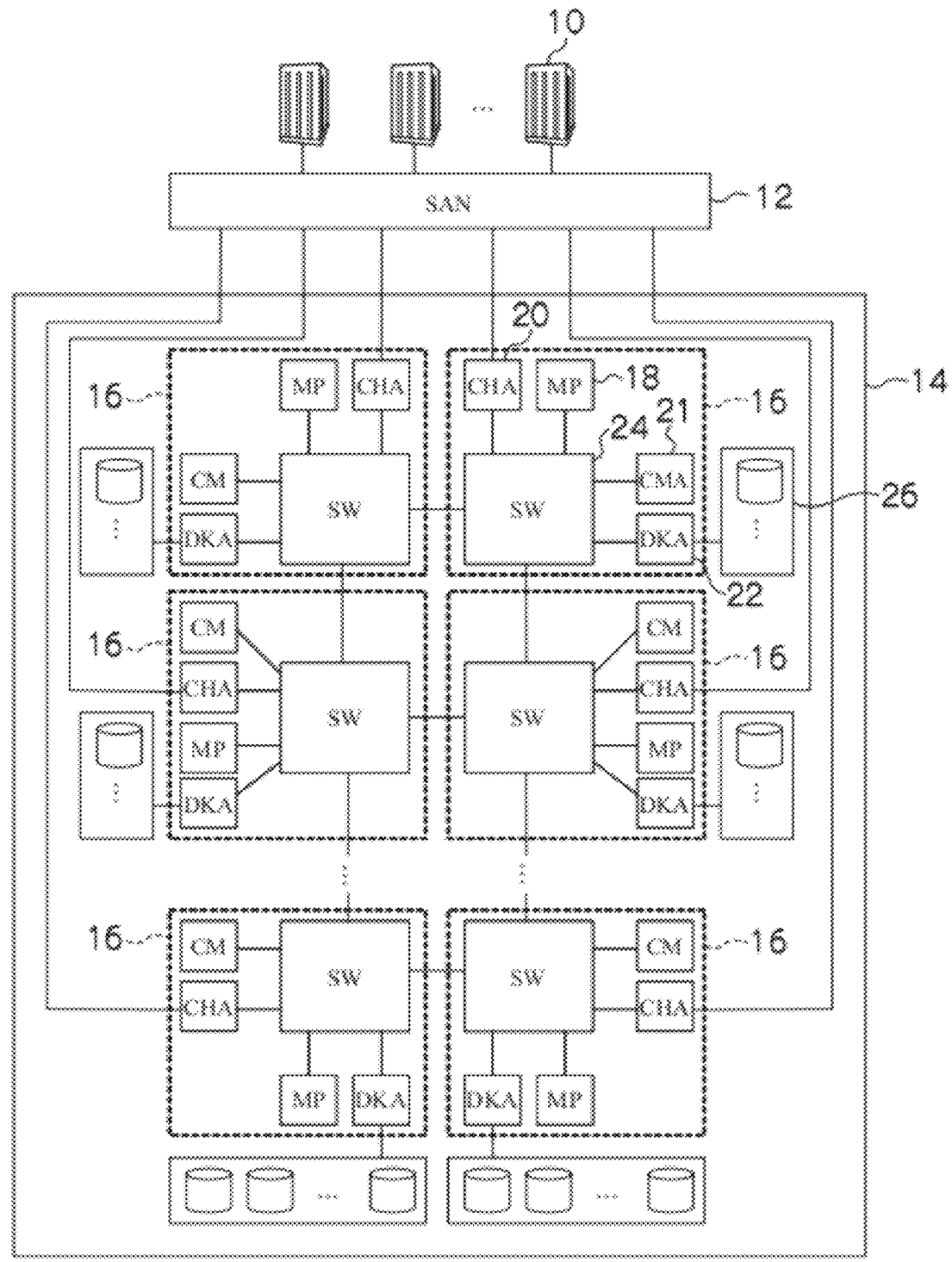
FIG. 1 is a block diagram of a storage system according to the present invention.

Embodiments of the present invention are now explained with reference to the attached drawings. FIG. 1 is a block diagram of a storage system of this invention. This storage system is configured by a plurality of host computers 10 being connected to a storage subsystem 14 via a SAN 12 as a network means.

The storage subsystem 14 is structured as a grid storage. In other words, modules 16 can be sequentially added to the storage subsystem. A module 16 comprises a storage resource, and a plurality of internal components for controlling the input and output of data to and from a storage resource such as a channel adapter.

The individual modules 16 comprise a channel adapter (CHA) 20, a microprocessor (MP) 18, a cache memory adapter (indicated as CMA or CM) 21, a disk adapter (DKA) 22, a storage device (primary storage apparatus) 26 such as a hard disk drive (HDD) as a storage resource, and a switch adapter (SW) 24.

The channel adapter 20 controls the data transfer with the host computers 10. The disk adapter 22 controls the data transfer with the storage device 26. The cache memory adapter 21 temporarily stores data that is transferred between the host computer 10 and the storage device 26. The microprocessor 18 controls the channel adapter 20 and the disk adapter 22 so as to control the packet transfer via the switch adapter 24.

The switch adapter 24 of the individual modules mutually connects the CHA 20, the MP 18, the CMA 21, and the DKA 22 of its own module, connects the internal components thereof to the switch adapter of other modules, and thereby configures an internal network for realizing packet transfer within a single module and with other modules.

Therefore, a read or write command from the host computer 10 is transmitted to the DKA 22 of the target module via the switch adapter 24 of the respective modules and based on the packet transfer through the switch adapter of other modules.

Figure 2:
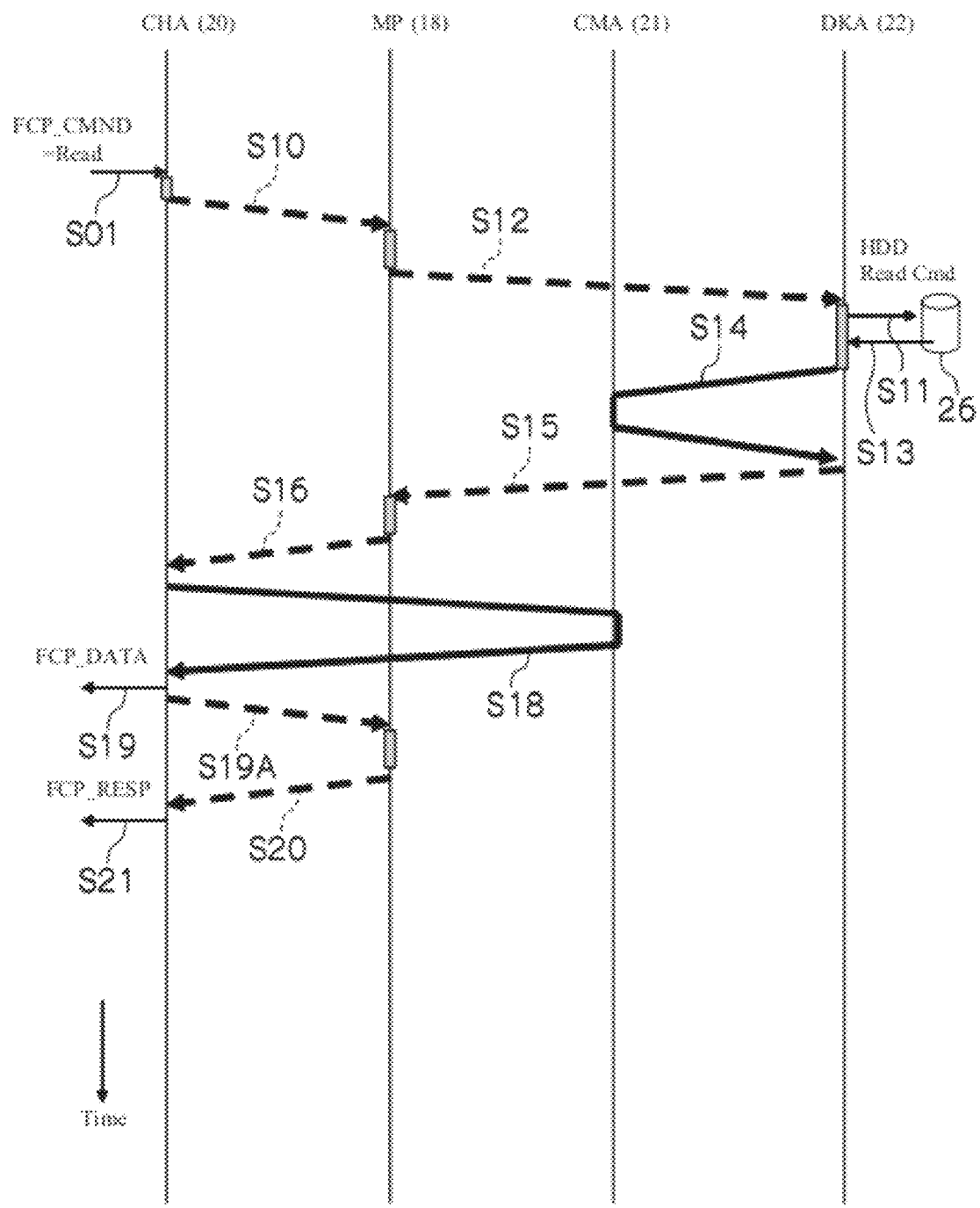
FIG. 2 is a ladder chart explaining packet transfer processing when a read request is issued from a host computer to a storage subsystem.

FIG. 2 is a ladder chart explaining the flow of packet transfer processing within the switch and between switches of the storage subsystem when a read request frame is issued from the host computer 10 to the storage subsystem 14.

The dotted lines show a so-called posted access where the transfer source component of the packet does not request the reply packet from the transfer destination component of the command packet, and the solid lines show a so-called non-posted access where the transfer source component of the command requests the reply from the transfer destination component of the command. The command packet for requesting the reading or writing of data is usually transferred according to a non-posted access format from the perspective of protecting data.

When a frame S01 is issued from the host computer 10 to the CHA, the CHA analyzes this frame, creates a packet S10 representing the type of frame (read request) and the address where the data exists, and sends this to the MP via the SW.

The MP that received the reply analyzes where the data is stored; specifically, whether the data is stored in a storage device controlled by a certain DKA, or in a CMA, and, if the data is not stored in the CMA, it creates and sends a command packet S12 seeking such data to the DKA.

The example of FIG. 2 shows a case where the data is not initially stored in the CMA, and is only stored in the HDD 26. Whether the DKA, the CMA, and the HDD exist in the same module as the MP or in another module differs depending on the location where the data exists.

The DKA accesses a specific area of the HDD 26 and reads the data based on the packet S12 from the MP, stages the data to the CMA based on the non-posted access S14, and, upon completing the writing of such data into the CMA, sends a packet S15 indicating the completion of writing to the MP.

When the MP receives the packet, it sends to the CHA a packet S16 indicating that the data has been staged to the CMA and the address of the CMA where the data exists. Then, the CHA accesses a specified address of the CMA to read the target data (S18), and then notifies the data to the host computer (S19).

When the CHA 20 completes transferring the data to the host computer, it sends a packet S19A notifying such completion of data transfer to the MP 18. Subsequently, the MP confirms that there was no error in the sequential processing of reading the data based on the guarantee code of such data, and sends a packet S20 to the CHA requesting that it send a normal read end reply frame S21 to the host computer.

Figure 3:
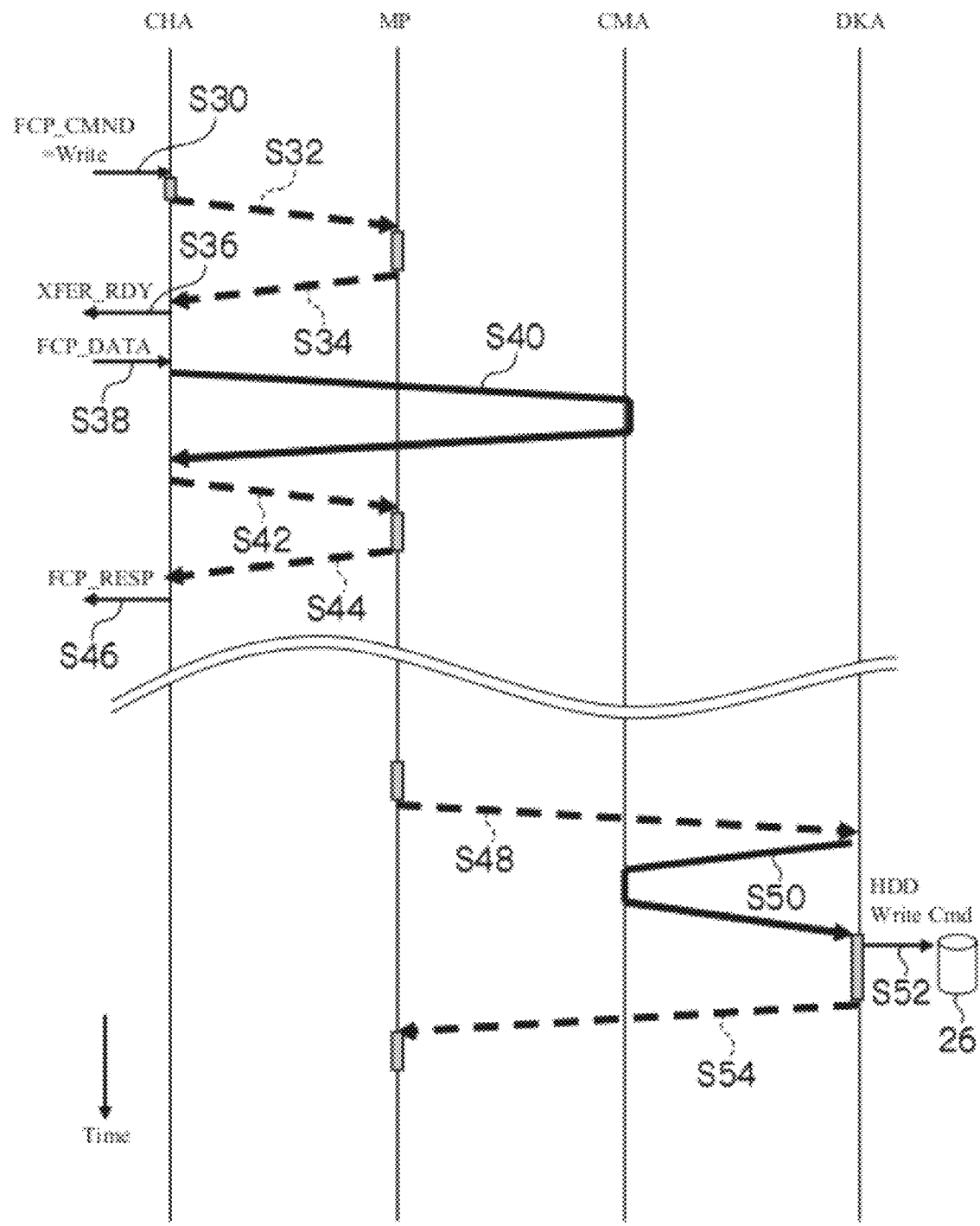
FIG. 3 is a ladder chart when a CHA receives a frame command of a write request from the host computer.

FIG. 3 is a ladder chart when a CHA receives a frame S30 of a write request from the host computer. When the CHA receives a write request from the host computer, the CHA sends a packet S30 corresponding to the write request to the MP, and the MP analyzes in which address of which CMA the data should be stored, and subsequently sends a command packet S34 to the CHA requesting the sending of data from the host computer. The CHA sends a frame S36 to the host computer requesting the sending of data.

When the CHA receives a frame 38 of the data from the host, the CHA sends a command packet S40 for writing data into a specific address of the CMA notified from the MP as a non-posted access to the corresponding CMA.

The CHA that received a reply from the CMA sends a packet S42 notifying the completion of data transfer to the MP. The MP that received the notice confirms that the data has been written into the CMA properly, and issues a packet S44 to the CHA. The CHA issues a reply frame S46 indicating a normal end to the host computer.

The MP issues, to the DKA that controls the HDD 26 to which data is to be stored, a packet S48 for notifying the CMA address where the data exists and the address of the hard disk drive 26 to which the data is to be written in order to destage the data of the CMA.

The DKA accesses the foregoing address of the CMA to retrieve the data, and issues a command packet requesting the sending of such data to the DKA as a non-posted access (S50).

The DKA that received the data stores the corresponding data in a specified address of the HDD 26 (S52). Subsequently, the DKA notifies the MP that the data was subject to destage processing (S54). The MP stores directory information (comparison of address in the CM that happened to temporarily store data and logical address designated uniquely by the host system) in its own memory.

Figure 4:
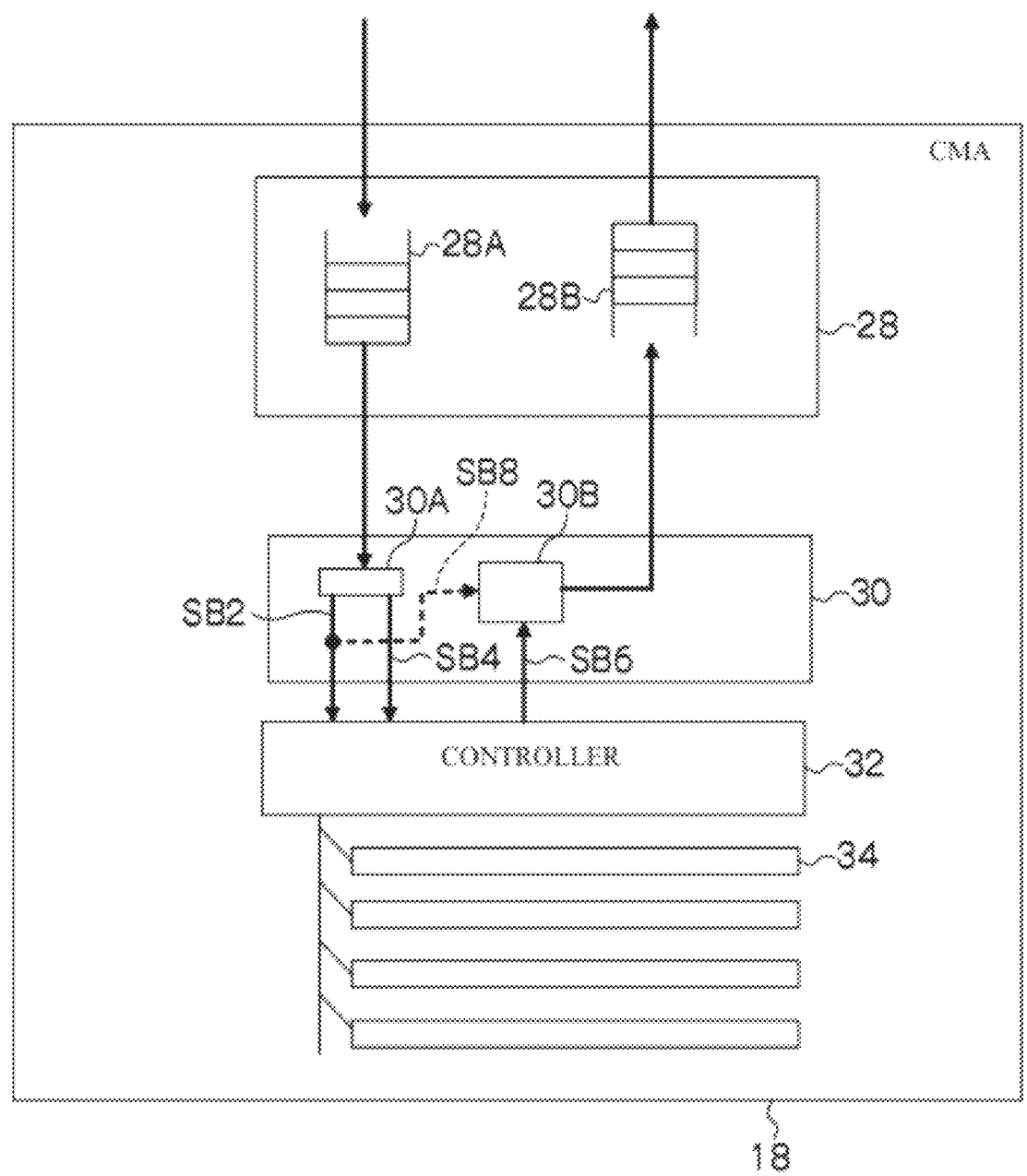
FIG. 4 is a hardware block diagram of a cache memory.

FIG. 4 is a hardware block diagram of the cache memory. The cache memory comprises a memory module 34 for storing cache data, and a memory module controller 32. The memory module controller is connected to an internal network control unit 28 via a packet processing unit 30.

The internal network control unit 28 is a block for controlling the sending and receiving of packets, and comprises a receive buffer 28A for receiving the packets in order, and a send buffer 28B for sending the packets in order. The receive buffer 28A and the send buffer 28B are configured from a memory having an FIFO structure.

The packet processing unit 30 comprises a command packet analysis unit 30A, and a reply packet creation unit 30B. The command packet analysis unit 30A receives the command packets in order from the receive buffer 28A, and analyzes the address and data contained in the command packets. Reference numeral SB2 is an address signal line for notifying the address to the memory module controller 32, and reference numeral SB4 is a data signal transmission line for notifying the data.

If the command is a write command, the memory module controller 32 stores the data in the address of the memory module based on the address and data notified from the command packet analysis unit 30A. Meanwhile, if the command is a read command, the memory module controller 32 reads the data from the address of the memory module. The read data is sent to the reply packet creation unit 30B via a data reading line SB6.

The reply packet creation unit is a block for creating a packet representing a data write reply or a data read reply, and creates a reply packet by referring to an address signal SB8 of the address signal line SB2. The reply packets are sent in order to the send buffer B.

Figure 5:
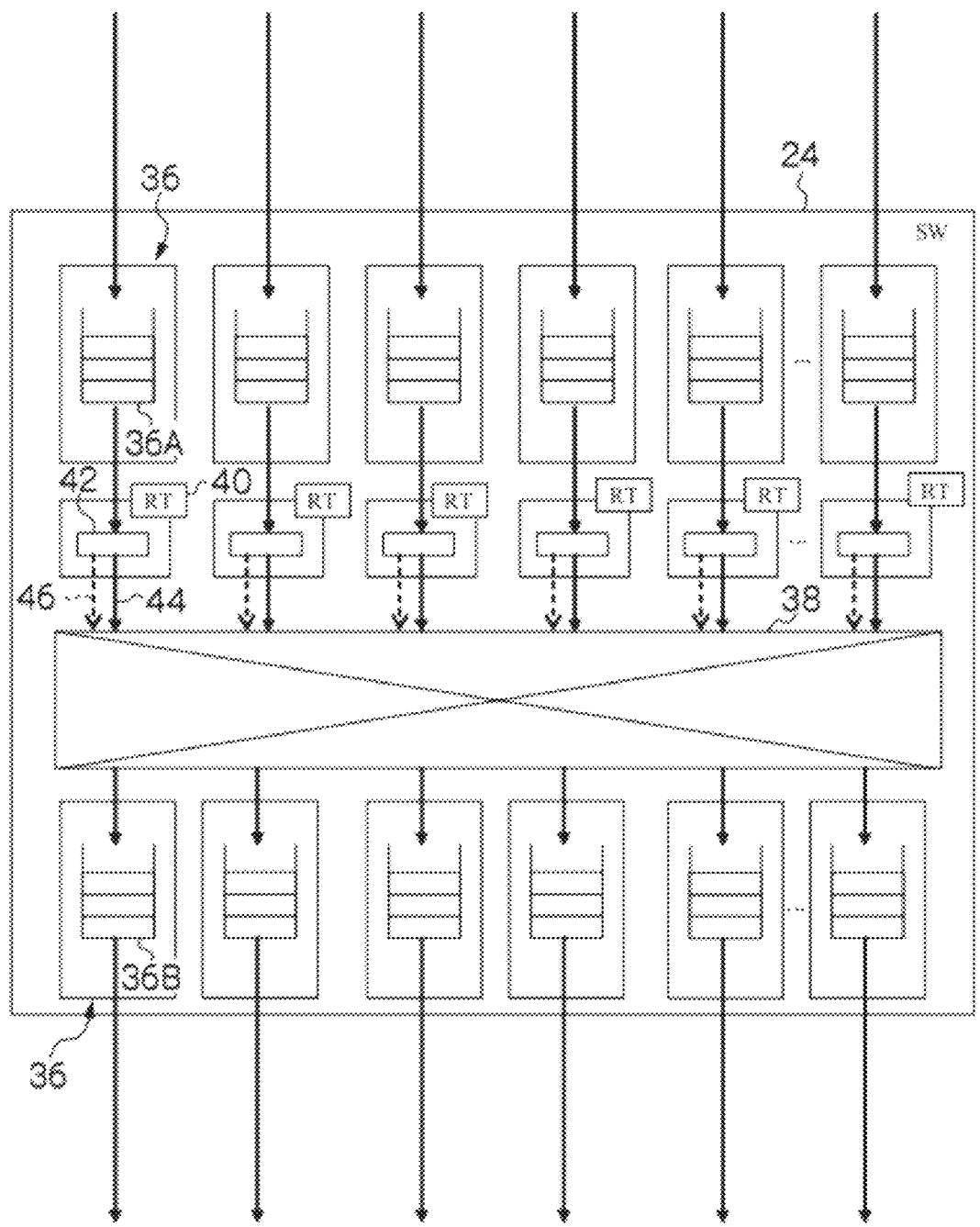
FIG. 5 shows a block configuration of a switch adapter.

FIG. 5 shows a block configuration of the switch adapter. The switch adapter 24 comprises a plurality of internal network control units 36 that respectively include a receive buffer 36A and a send buffer 36B. Each internal network control unit is connected to an interconnection network 38, and the receive buffer and the send buffer of the respective internal network control units can be mutually connected to the receive buffer and the send buffer of the other internal network control units, respectively.

In addition, the respective internal network control units 36 are also connected to the interconnection network 38 via the packet analysis unit 42 for analyzing commands and replies.

The packet analysis unit 42 comprises a routing table (RT), and decides to which send buffer (port) the packet can be sent to according to the RT. Reference numeral 46 is a signal line for sending a signal to the interconnection network 38 in order to specify the port address, or the target send buffer among the plurality of send buffers, and reference numeral 44 is a signal line for sending packets to the interconnection network 38.

The interconnection network 38 specifies the send buffer 36B based on the port address, and sends packets to this send buffer. Incidentally, the receive buffer 36A and the send buffer are both configured as an FIFO structure.

Figure 6:
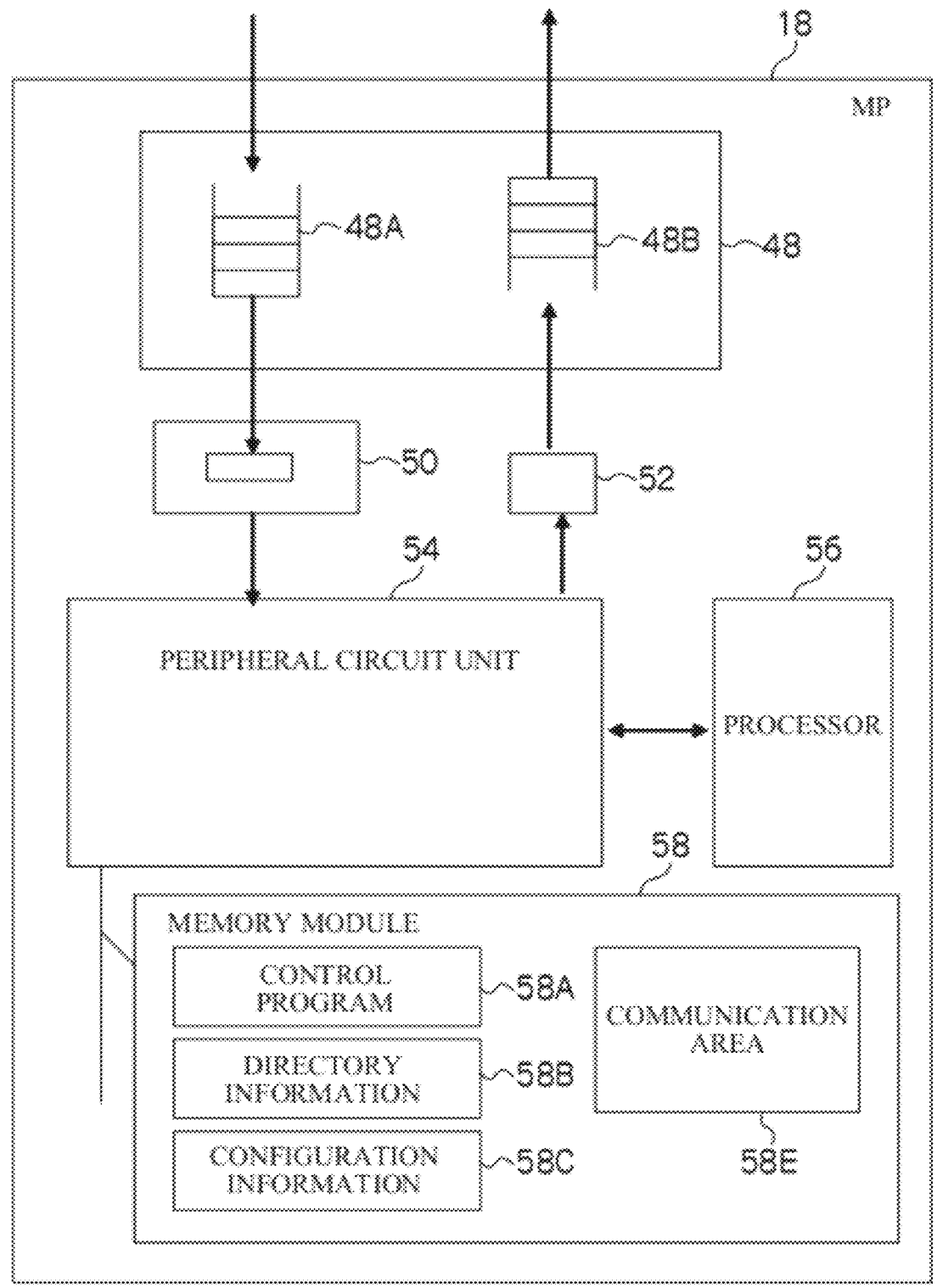
FIG. 6 shows a block configuration of a microprocessor.

FIG. 6 shows a block configuration of the microprocessor 18. [The microprocessor 18] comprises an internal network control unit 48, a packet analysis unit 50, and a packet creation unit 52. The internal network control unit 48 comprises a receive buffer 48A and a send buffer 48B. The configuration of these components is the same as the components explained with reference to the cache memory adapter (FIG. 4).

The microprocessor 18 additionally comprises a memory module 58 and a peripheral circuit unit 54 connected to a processor 56. The packet analysis unit 50 and the packet creation unit 52 are connected to the peripheral circuit unit 54. The processor 56 controls the respective components based on the management blocks stored in the memory module 58.

The memory module 58 comprises a control program 58A for controlling the storage subsystem (internal component), directory information 58B showing the storage status of user data in the CMA, configuration information 58C of the storage subsystem, and a communication area 58E to be used in the communication with other internal components.

Figure 7:
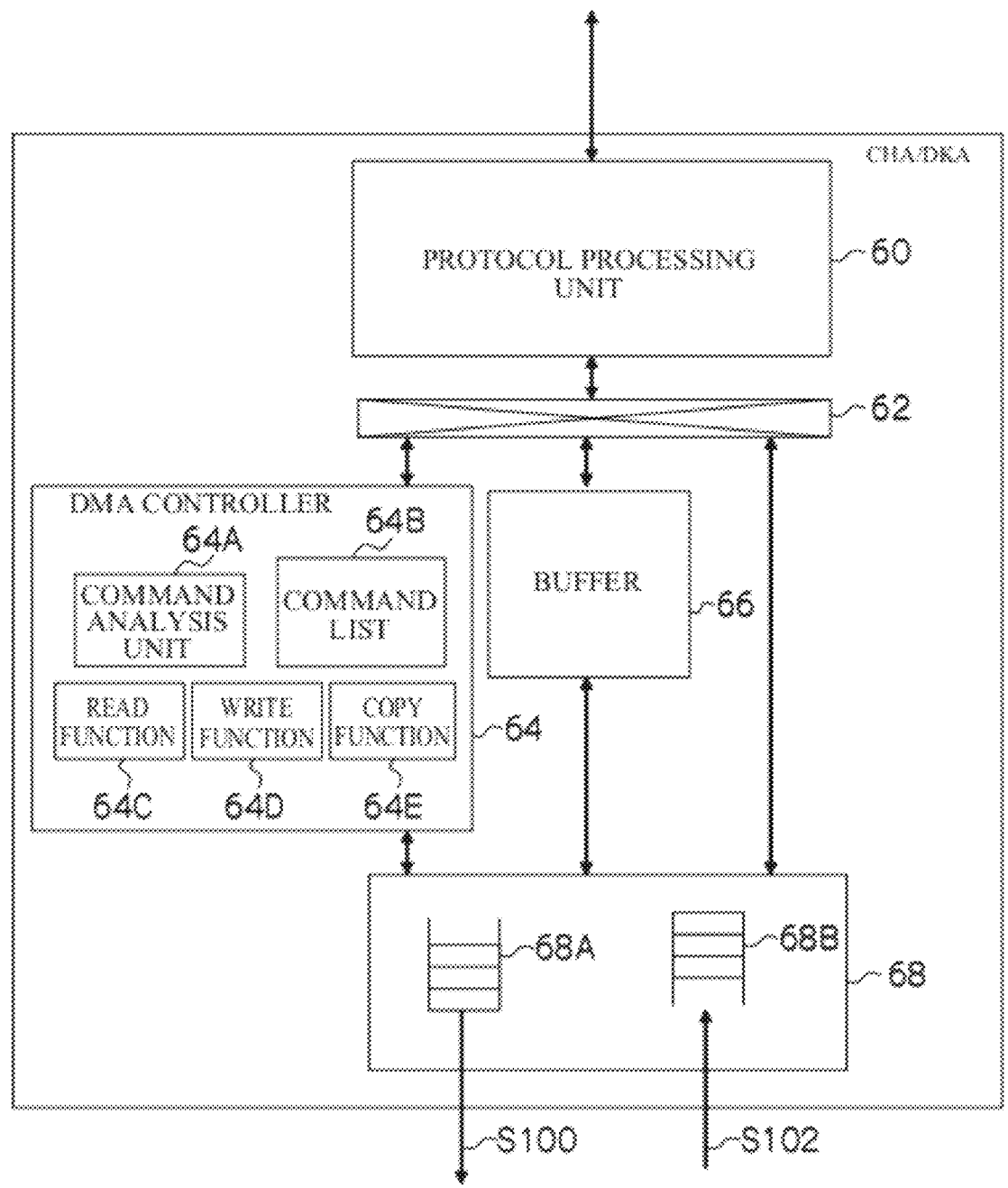
FIG. 7 shows a block configuration of a CHA/DKA.

FIG. 7 shows a block configuration of the CHA/DKA. The CHA and the DKA may be configured with a separate IC or the same IC. The CHA/DKA comprises a protocol processing unit 60, and this protocol processing unit is connected to a host computer or a SAN or a LAN in the case of a CHA, and connected to a storage device in the case of a DKA, and performs protocol conversion processing between with host computer or the hard disk drive. In addition, the CHA/DKA comprises a port to be connected to the switch adapter, and this port is connected to an internal network control unit 68.

In addition, the internal network control unit 68 is connected to a buffer 66 and a DMA controller 64A. The DMA controller and the buffer are connected to a protocol processing unit 60 via an interconnection network 62. The internal network control unit 68 is connected to the interconnection network 62. The interconnection network 62 is configured from a switch, and the protocol control unit 60 can be connected to the DMA controller 64, the buffer 66, or the internal network control unit 68 via the interconnection network 62.

The DMA controller 64 analyzes the command set by the MP using the command analysis unit 64A, and thereby transfers data. Commands include those which realize a read function 64C, a write function 64D, or a copy function 64E, or those which include the transfer destination or the transfer source of the packet indicated with the cache address. The DMA controller 64 is able to collectively store a plurality of commands in the form of a command list 64B.

In the case of a CHA, the MP controls the exchange of protocols with the host computer through the protocol control unit 60.

When a write command is issued from the host computer, the write data from the host computer is once stored from the protocol control unit 60 into the buffer 66. In addition, the DMA controller 64 controls the transfer of data stored in the buffer to the CMA via the receive buffer 68A.

If the command from an information processing unit such as the host computer is a read command, the DMA controller 64 once stores the data read from the CMA via the receive buffer 68A into the buffer 66, and the protocol control unit 60 sends this data to the host computer. In the case of a DKA, the subject merely changes from a host computer to a hard disk drive, and the processing operation is the same as in the case of a CHA. Further, in the case of a DKA, an arithmetic circuit for RAID-controlling the hard disk drive may also be provided.

Figure 8:
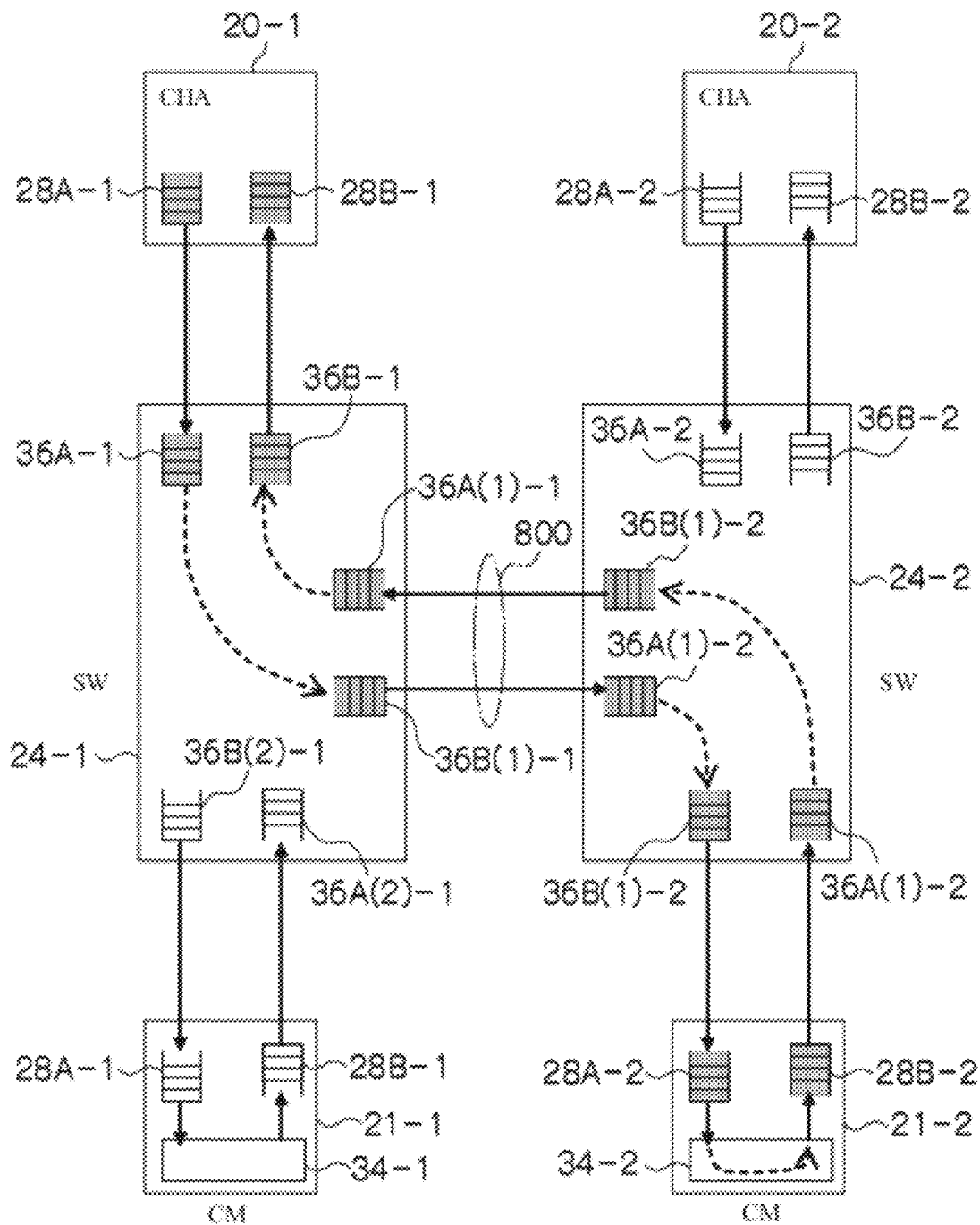
FIG. 8 is a block diagram showing the process where a read request from the host computer is processed between two modules with a packet associated with a non-posted access.

FIG. 8 is a block diagram showing the process where a read request from the host computer is processed between two modules with a packet associated with a non-posted access.

The CHA 20-1, the switch adapter (SW) 24-1, and the CMA 21-1 are internal components of a first module. The CHA 20-2, the switch adapter 24-2, and the CMA 21-2 are internal components of a second module.

A single path 800 is formed between the port of the SW 24-1 and the port of the SW 24-2. The CHA 20-1 attempts to access the CMA 21-2 via the path 800 between the two switches in order to read data of the CMA 21-2 of the second module.

The CHA 20-1 that received a read request from the host computer 10 transfers the packet from the send buffer 28A-1 to the receive buffer 36A-1 of the SW 24-1. The receive buffer 36A-1 outputs the packet to the send buffer 36B(1)-1 according to the routing table (RT). The send buffer 36B(1)-1 transfers command packets to the receive buffer 36A (1)-2 of the SW 24-2 via the path 800.

This packet is transferred to the receive buffer 28A-2 of the CMA 21-2 via the send packet 36B(1)-2 of the SW 24-2. The CMA 21-2 sends the reply packet, together with the data of the memory module 34-2, to the receive buffer 36A (1)-2 of the SW 24-2 via the send buffer 28B-2.

The SW 24-2 sends this packet to the reception packet 36B-1 of the SW 24-1 via the send buffer 36B(1)-2 and the path 800. The SW 24-1 transfers the packet containing the data to the receive buffer 28B-1 of the CHA 20-1 via the send buffer 36B-1.

Figure 9:
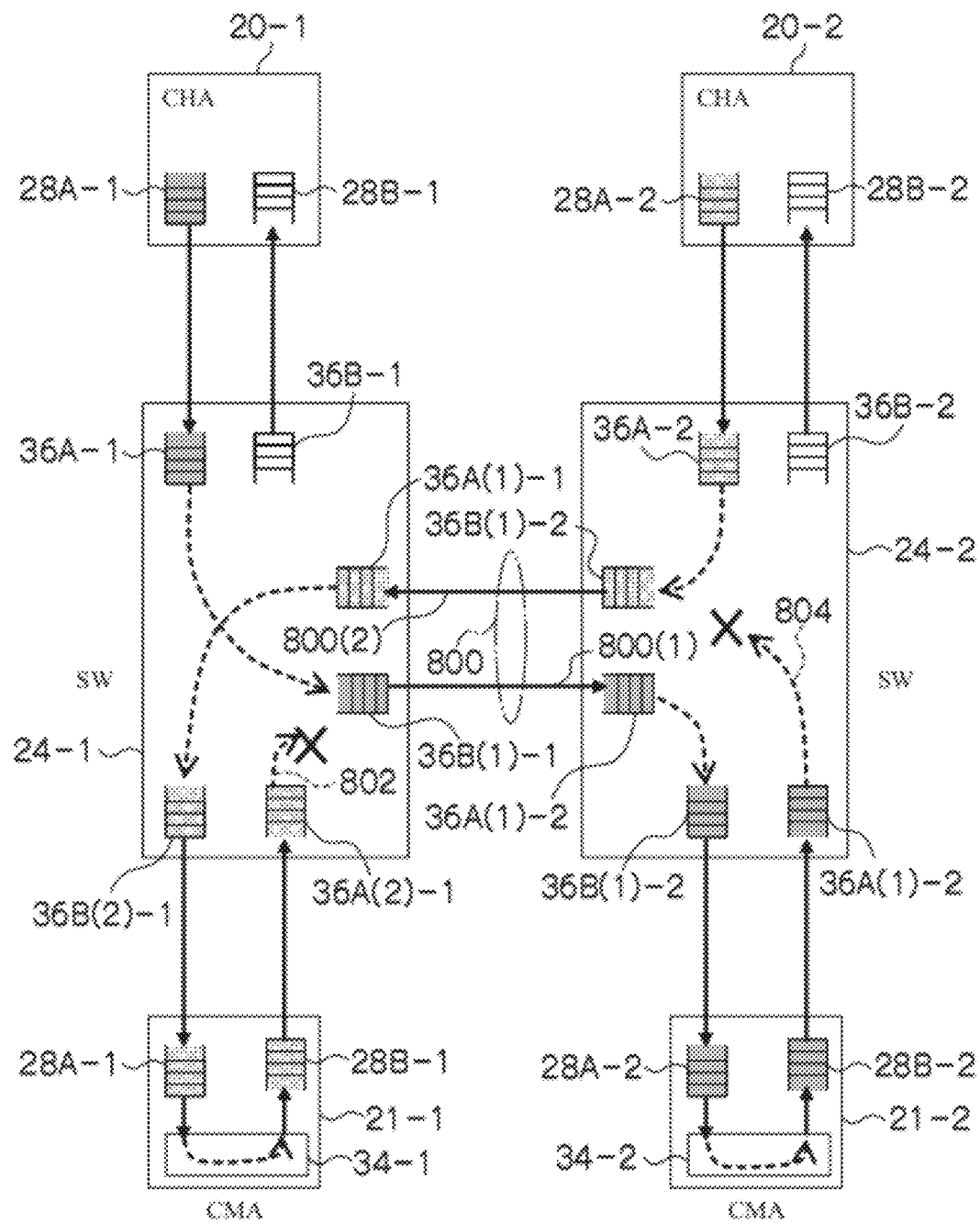
FIG. 9 is a block diagram showing a status where a plurality of packets become deadlocked when a read request is simultaneously issued from the host computer to a first module and a second module, respectively.

FIG. 9 is a block diagram showing a status where a plurality of packets issued consecutively from the CHA or CMA to the switch adapters (SW) become deadlocked when a read request is simultaneously issued from the host computer 10 to the CHA 20-1 a first module and the CHA 20-2 of a second module, respectively.

The CHA 20-1 attempts to read data from the CMA 21-2 based on a read request from the first host computer, and the CHA 20-2 attempts to read data from the CMA 21-1 based on a read request from the second host computer. Thereby, the command packet 800(2) headed from the SW 24-1 toward the SW 24-2 and the command packet 800(1) heading in the opposite direction will try to flow along the same path 800.

Here, the packet based on the read request from the host computer to the first CHA 20-1 will occupy the send buffer 36B(1)-1, and the packet 802 from the host computer to the second CHA 20-2 based on the read request will become locked.

In addition, the packet based on the read request to the CHA 20-2 will occupy the send buffer 36B(1)-2, and the packet 804 from the host computer to the first CHA 20-1 based on the read request will become locked. Thereby, both packets will respectively occupy the send buffer 36B(1)-1 and the send buffer 36B(1)-2, "freezing" where the progress of transfer processing of packets is prohibited will occur, and this will eventually lead to a deadlock.

This deadlock occurs because the command packet sent from the SW of one module to the SW of another module is transferred bi-directionally along the same path 800.

Thus, as the first rule for transferring packets in order to prevent a deadlock, the direction of command packets to be transferred along the path among a plurality of switch adapters is restricted to a single direction. Nevertheless, in the example shown in FIG. 9, if the direction of the command packet in the path 800 is restricted to be from the SW 24-1 to the SW 24-2, the CHA 20-2 will not be able to send a command packet to the CMA 21-1.

Figure 10:
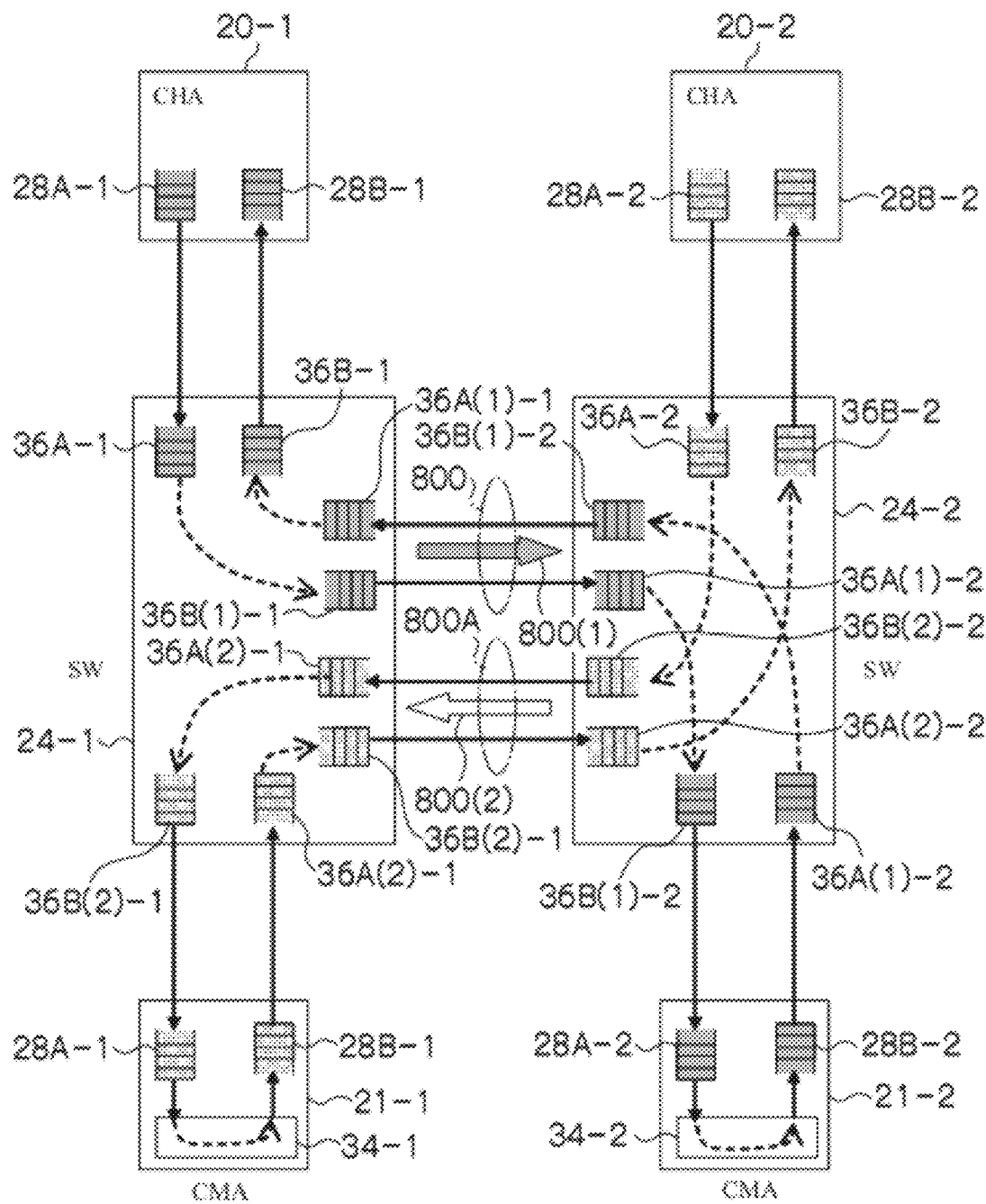
FIG. 10 is a block diagram showing that paths are formed in duplicate between two switches.

In order to overcome the foregoing problem, as shown in FIG. 10, a second path 800A is formed in addition to the path 800 between the SW 24-1 and the SW 24-2. Further, a receive buffer 36A(2)-1 and a send buffer 36B(2)-1 to be respectively connected to the path 800A are provided to the SW 24-1, and a receive buffer 36A(2)-2 and a send buffer 36B(2)-2 to be respectively connected to the path 800A are provided to the SW 24-2.

Then, the MP of the respective modules creates and stores a control table for realizing the foregoing first transfer rule in the memory module 58. The routine table 40 of the switch is set based on this control table. The transfer control rule is realized by transferring the packet according to the control table or the routing table. The control table will be described in detail later.

According to the setting of the routing table based on the control table, the command packet headed from the SW 24-1 toward the SW 24-2 is transferred along the path 800 as shown with the arrow 800(1), and the command packet headed from the SW 24-2 toward the SW 24-1 is transferred along the path 800A, and not the path 800, as shown with the arrow 800(2).

The reply packet from the CMA 21-2 to the CHA 20-1 is transferred in the opposite direction of the transfer direction 800(1) of the command packet along the path 800 in which the command packet was transferred, and the reply packet from the CMA 21-1 to the CHA 20-2 is transferred in the opposite direction of the [transfer direction] 800(2) along the path 800A.

Thereby, resources for sending packets are expanded, and, since a plurality of packets will be released from a mutually competing status, the occurrence of the deadlock shown in FIG. 9 can be prevented.

As described above, a deadlock can be prevented by at least restricting the direction that the command packet is transferred. Although a deadlock can be prevented by forming a path for transferring the reply packet separately from the path for transferring the command packet, in this case, however, the buffer configuration of the module and the path configuration between switches will become complex. Thus, this embodiment explains a case where the reply packet to the command packet flows along the same path as the path in which the command packet flows.

Figure 11:
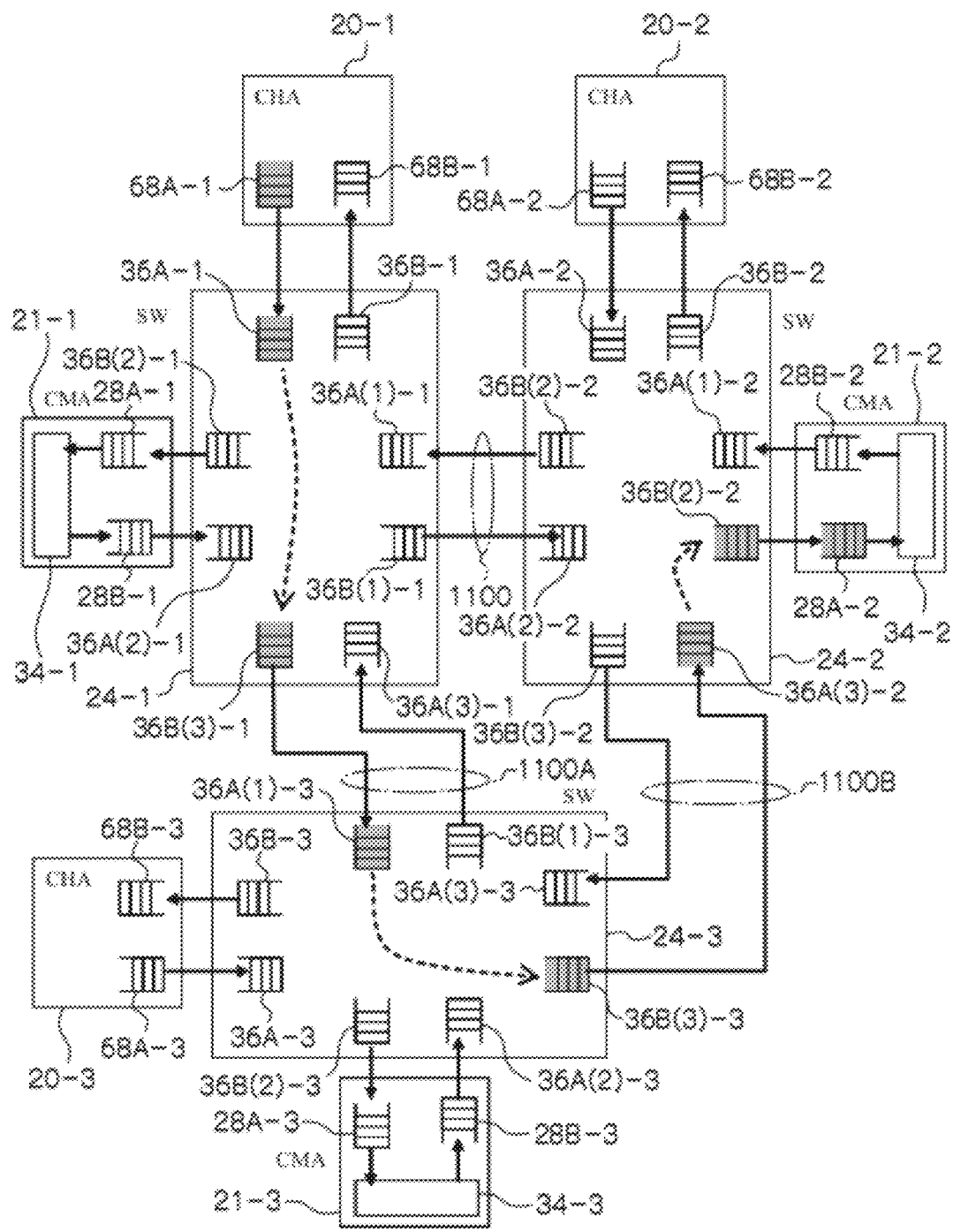
FIG. 11 is a block diagram showing that the first module is connected to the second module via a path, the second module is connected to a third module via a path, and the third module is connected to the first module via a path.

FIG. 11 is a block diagram showing that the SW 24-1 of the first module is connected to the SW 24-2 of the second module via a path 1100, the SW 24-2 of the second module is connected to the SW 24-3 of a third module via a path 1100B, and the SW 24-3 of the third module is connected to the SW 24-1 [of the first module] via a path 1100A.

The direction of the command packet to be transferred along these paths is restricted in the direction from the SW 24-1 to the SW 24-3, from the SW 24-3 to the SW 24-2, and from the SW 24-2 to the SW 24-1 based on the foregoing first transfer rule.

Here, when the CHA 20-1 of the first module receives a request from the host computer for writing data into the CMA 21-2 of the second module, the command packet passes through the receive buffer 36A-1 and the send buffer 36B(3)-1 of the SW 24-1, the receive buffer 36A(1)-3 and the send buffer 36B(3)-3 of the SW 24-3, and the receive buffer 36A(3)-2 and the send buffer 36B(2)-2 of the SW-2 in that order, and data is written from the receive buffer 28A-2 of the CMA 24-2 into the memory module 34-2. The dotted lines shown in FIG. 11 show the flow of the command packet.

The CMA 21-2 creates a reply packet, and this reply packet is subsequently sent to the CHA 20-1 from the SW 24-2 via the SW 24-3 and the SW 24-1 in the opposite direction of the command packet.

When the CHA 20-2 receives a write request for writing data into the CMA 21-3, the command packet is supplied to the SW 24-2, and subsequently up to the SW 24-3 via the SW 24-1. In addition, when the CHA 20-3 receives a write request for writing data into the CMA 21-1, the command packet is supplied to the SW 24-3, and subsequently up to the SW 24-1 via the SW 24-2.

Figure 12:
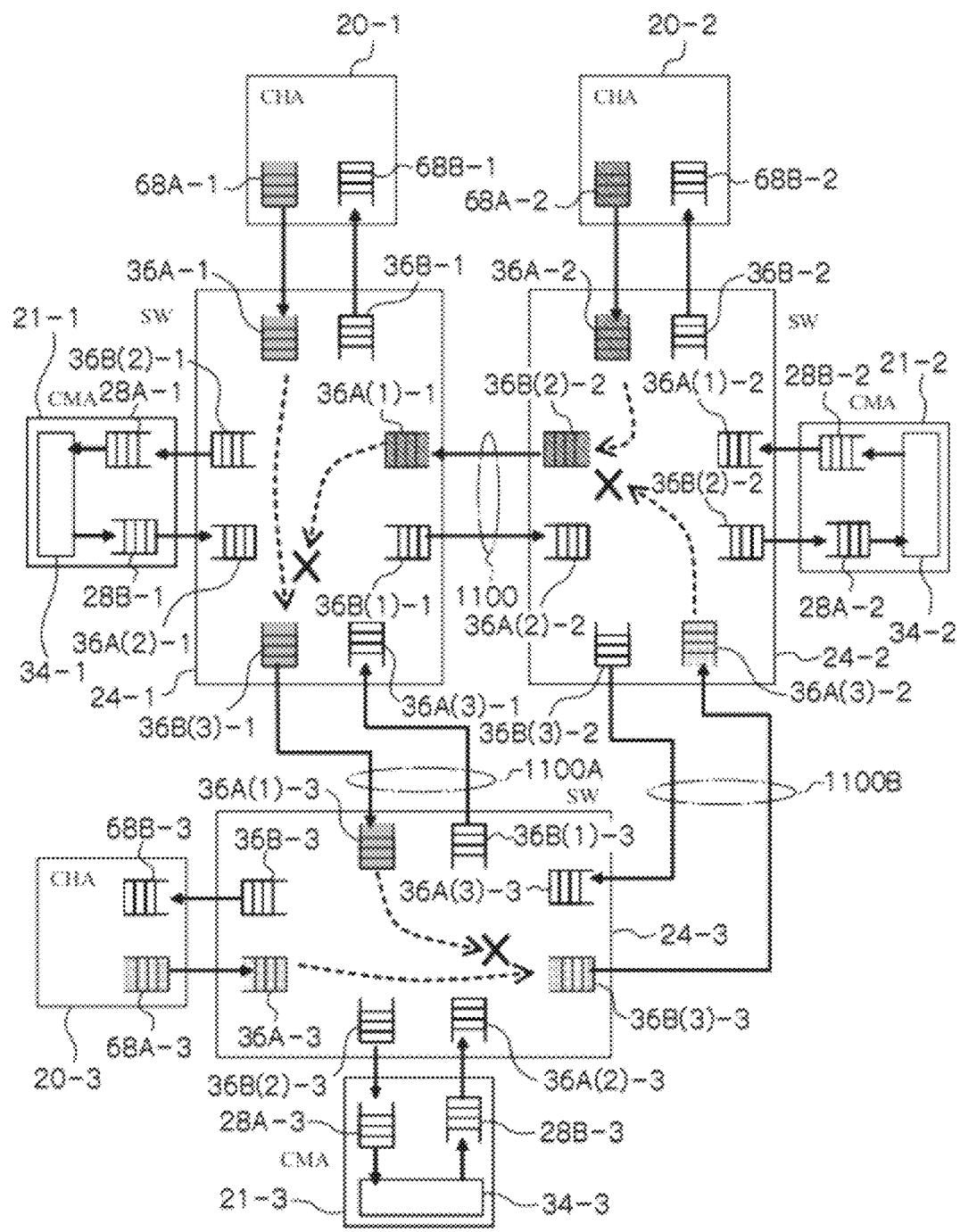
FIG. 12 is a block diagram showing the status where a deadlock is occurring during the packet transfer of FIG. 11.

Here, if a write request is simultaneously supplied to the CHA 20-1, the CHA 20-2, and the CHA 20-3, as shown with the "×" in FIG. 12, the transfer of the command packet will freeze in a loop shape, and a plurality of command packets will mutually compete and enter a deadlock.

The occurrence of this deadlock is caused because the respective packets attempt to cross a plurality of modules via the path between the SW and the module in the transfer of each of such plurality of packets, and this can be overcome by restricting the number of paths (hop count) that at least one packet can cross. This is referred to as a second transfer control rule.

Figure 13:
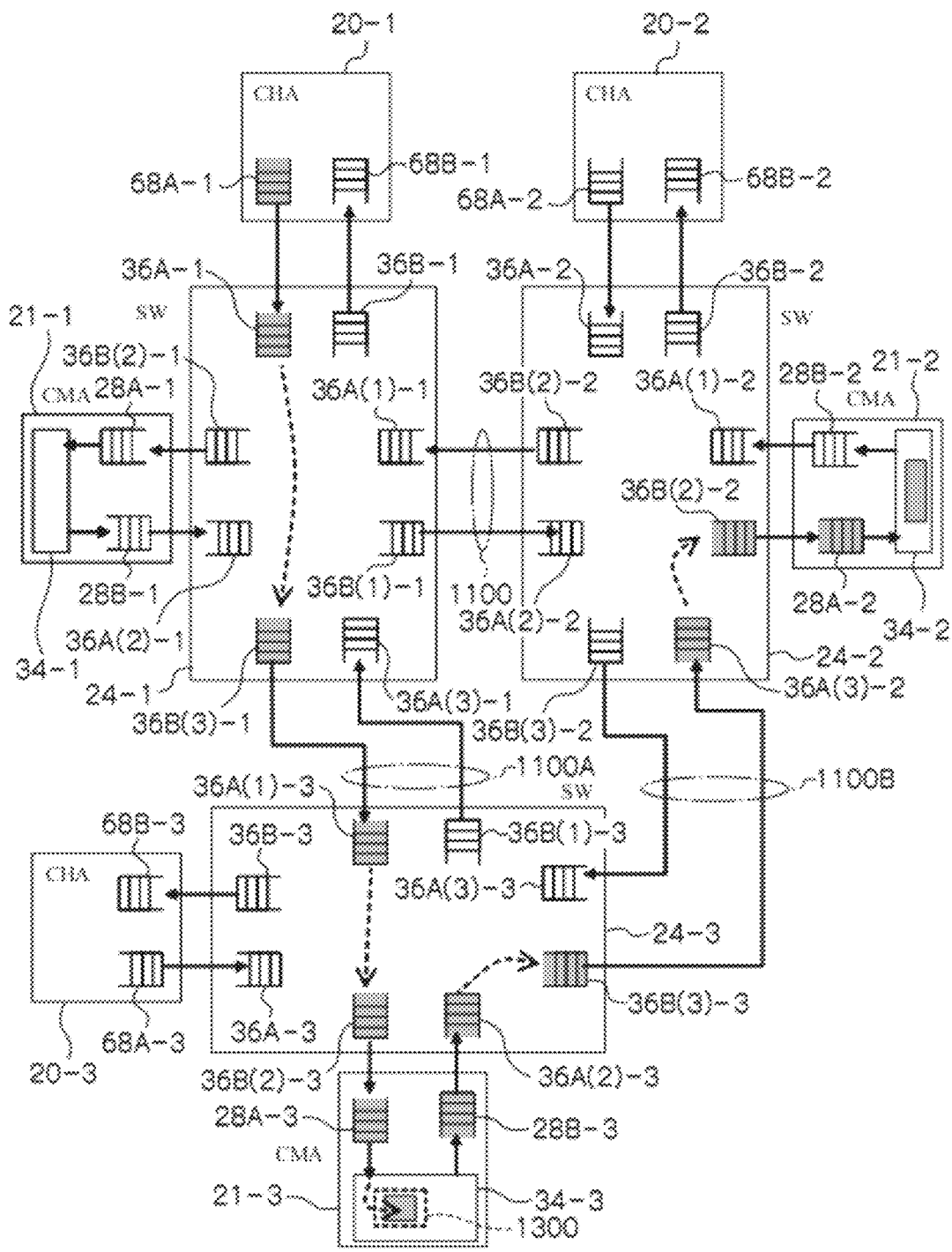
FIG. 13 is a block diagram explaining the situation where the deadlock of FIG. 11 is released.

Thus, as shown in FIG. 13, as one means for restricting the hop count of the command packet from the SW 24-1 from "2" shown in FIG. 12 to "1," the write data of the command packet from the CHA 20-1 is temporarily stored in the CMA 21-3 to be connected to the SW 24-3 (1300).

Thereby, although FIG. 12 showed a case where the packet hop count was "2" from the SW 24-1 to the SW 24-2 via the SW 24-3, FIG. 13 shows a case where the hop count of the command packet is once ended at the SW 24-3, and then restricted to one hop from the SW 24-1 to the SW 24-3, or restricted to one hop from the SW 24-3 to the SW 24-2.

Thereby, since one packet can be released from the transfer loop (refer to FIG. 12) of three competing packets that are causing the deadlock, it is possible to prevent a deadlock before it happens.

The second transfer control rule for restricting the packet hop count is stored in the memory of the MP of the respective modules in the form of a transfer control table. The MP achieves the second transfer control rule by SW-controlling the packet transfer based on this transfer control rule.

Figure 14:
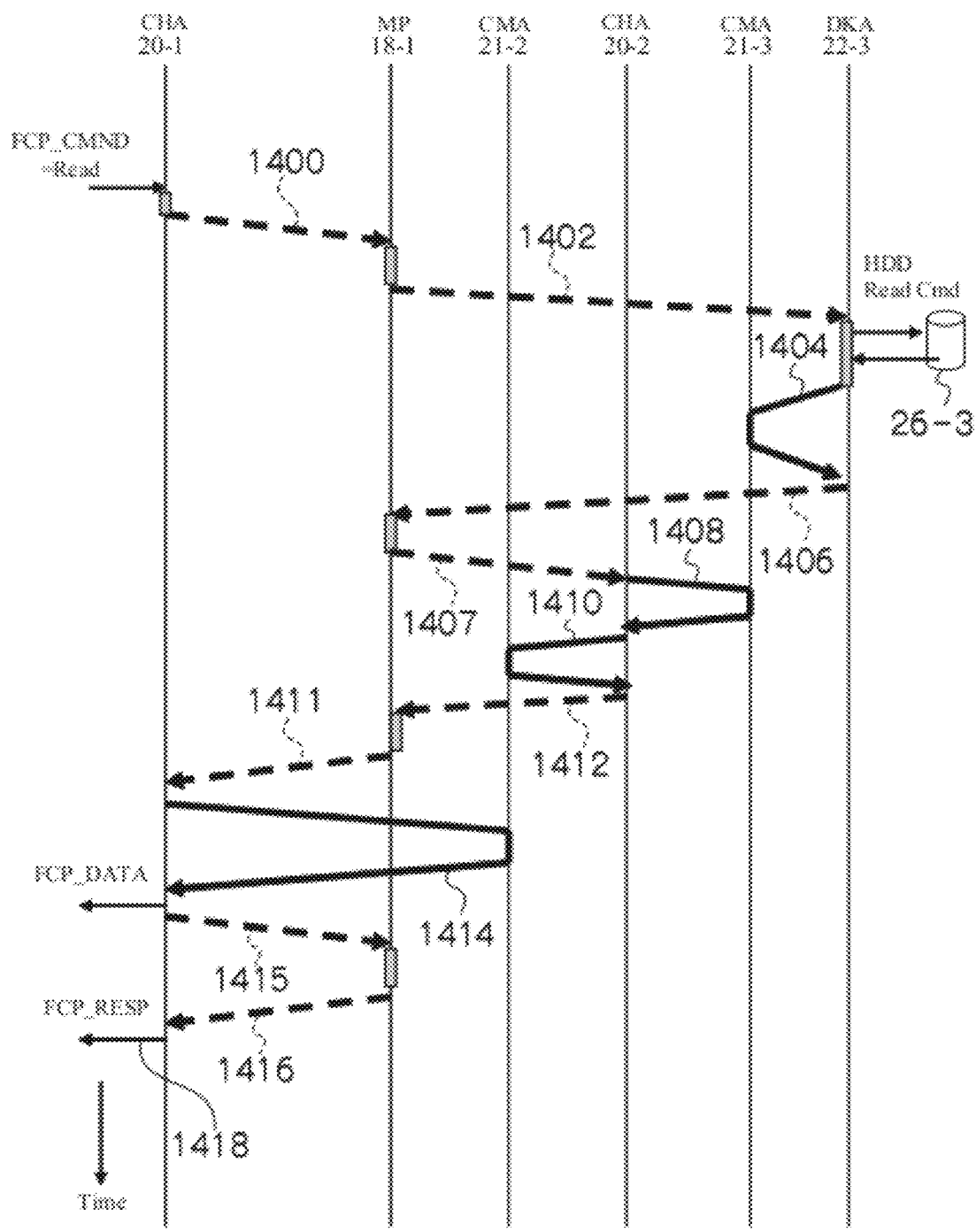
FIG. 14 is a ladder chart pertaining to an embodiment of processing a read command from the host computer based on a first transfer control rule and a second transfer control rule.
Figure 15:
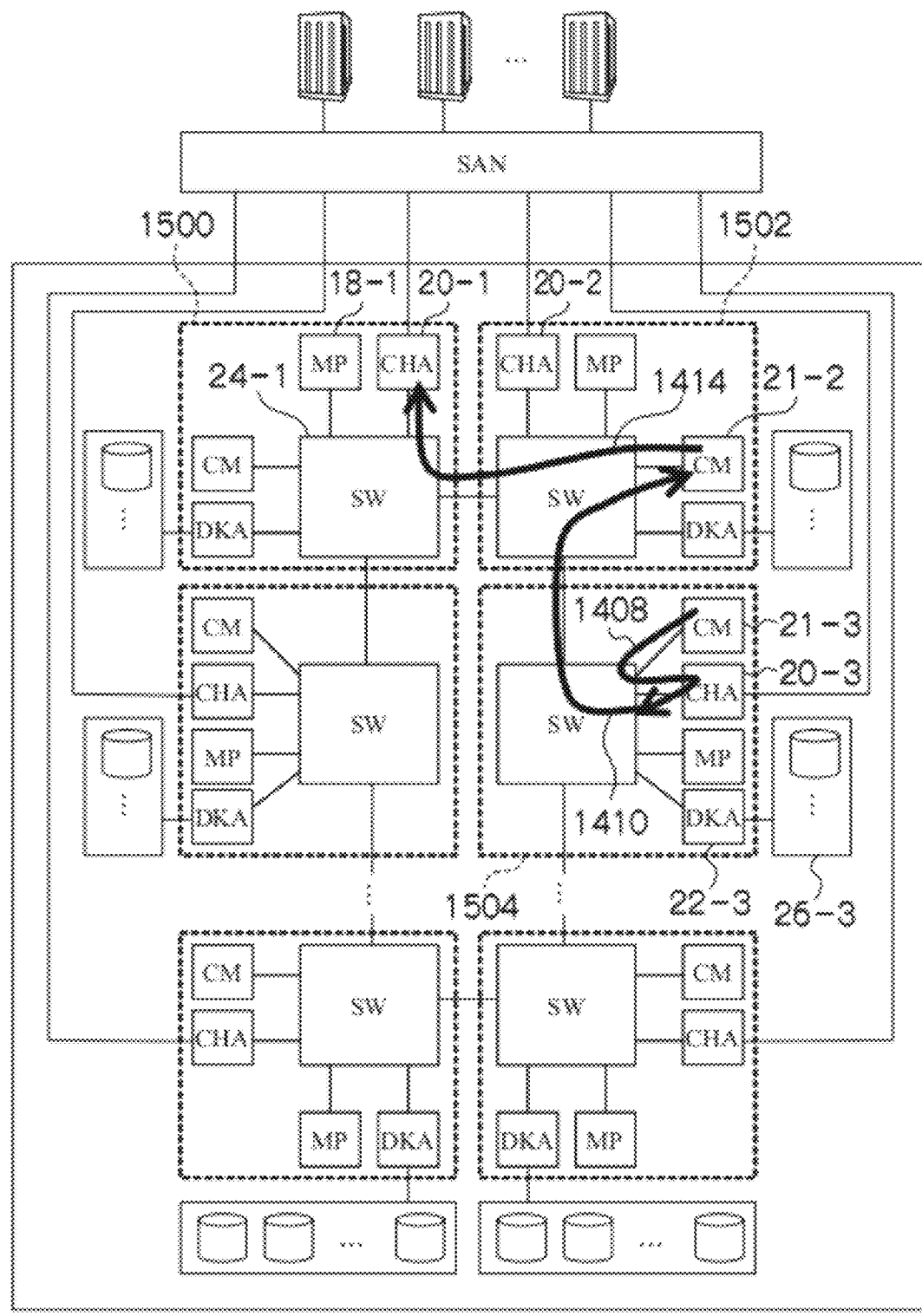
FIG. 15 is a block diagram showing the connection configuration of the internal components among a plurality of modules pertaining to the ladder chart of FIG. 14.

FIG. 14 and FIG. 15 are diagrams explaining an embodiment of processing a read command from the host computer based on the foregoing first transfer control rule and the second transfer control rule. The connection configuration of the internal components among a plurality of modules is shown in FIG. 15, and the ladder chart representing the packet transfer is shown in FIG. 14.

When the CHA 20-1 of the first module 1500 receives from the host computer a read request of data stored in the storage device 26-3 of the third module 1504, the protocol processing unit 60 of the CHA 20-1 analyzes the host read request and transfers it as a command packet 1400 to the MP 18-1 via the SW 24-1 of the same module.

The MP analyzes the data existing address of the command packet, and, when the corresponding data has not yet been stored in the CMA, creates and sends a command packet 1402 to the DKA 22-3 of the third module 1504.

The DKA 22-3 accesses the target area of the HDD 26-3 to read the data, and engages in a non-posted access 1404 to the CMA 21-3 for temporarily storing the data in the CMA 21-3 of the same module.

The DKA 22-3 sends a reply packet 1406 containing the address of the CMA 21-3 storing the data to the MP 18-1. Upon receiving the [reply packet 1406], the MP 18-1 sends a read command packet 1407 containing the address of the CMA 21-3 to the CHA 20-2 (of the second module 1502).

Upon receiving this packet, the CHA 20-2, as shown in FIG. 15, engages in a non-posted access 1408 to the CMA 21-3 and reads the target data from the CMA 21-3.

The CHA 20-2, as shown in FIG. 15, temporarily writes the read data into the CMA 21-2 of the second module 1502 based on the non-posted access 1410.

The CHA 20-2 creates a packet 1412 containing the address of the CMA 21-2 into which the data was written, and sends this to the MP 18-1. The MP 18-1 sends a packet 1411 containing the address of the CMA 21-2 storing the data to the CHA 20-1.

The CHA 20-1, as shown in FIG. 15, sends a command packet 1414 for requesting data based on a non-posted access to the CMA 21-2 and acquires the data. Subsequently, the CHA 20-1 transfers this data to the host computer, and the CHA 20-1 issues a command packet 1415 to the MP 18-1 for checking whether there was any error in the sequential processing for the CHA 20-1 to acquire the data.

The MP 18-1 performs this check, and creates a reply packet 1416 indicating that there was no error and sends this to the CHA 20-1. The CHA 20-1 sends a reply frame 1418 signifying that the data is correct to the host computer.

In FIG. 14 and FIG. 15, even when the packet for storing data in the CMA is transferred according to a non-posted access, and the packet transfer (1414) to be performed with the non-posted access passes through paths among a plurality of switches, this is limited to "1 hop."

With a non-posted access, since the packet source waits for a reply from the packet destination and competes with the other packets over the node resource (path or buffer), a deadlock occurs easily. Nevertheless, this deadlock can be prevented by limiting the non-posted access to "1 hop."

FIG. 16 is a packet frame showing the details of a packet. The packet format, as shown in FIG. 16(1), is configured from a packet type section representing the packet type such as a read command, a write command, a message, a read reply, and a write reply; a destination address section of the packet, a source address section of the packet, a data length section (request data length in the case of a read command), a data section (does not exist when the packet type is a read command or a write reply), and a check code section.

The destination address section, as shown in FIG. 16(2), is configured from a switch number (SW#), specific information of the module component, and a component internal address. The source address section is configured similarly.

Figures 17, 18:
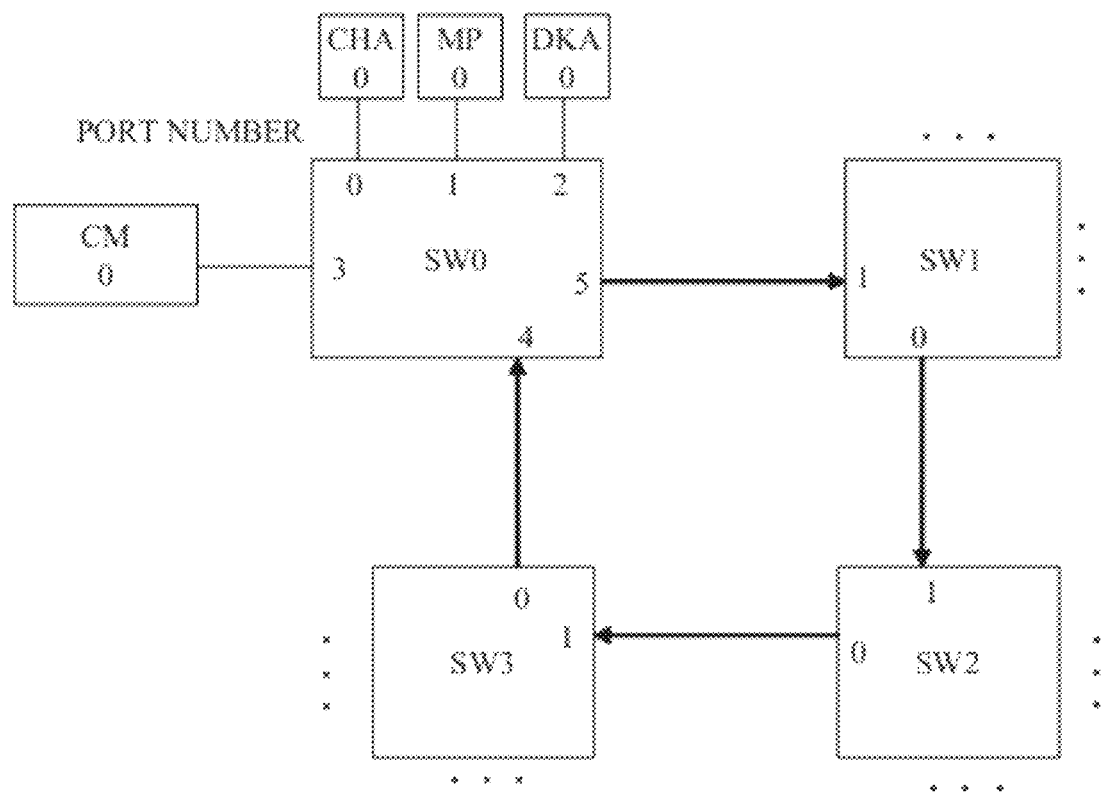
FIG. 17 is a path status table for setting the connection relationship with internal components of same modules such as other SW or CHA in the case of focusing on a certain switch.
FIG. 18 is a block diagram showing the path setting status of FIG. 17.

FIG. 17 is a path status table for setting the connection relationship with internal components of same modules such as other switches or CHAs in the case of focusing on a certain switch. FIG. 18 is a block diagram showing the path setting status of FIG. 17. As a result of the MP creating the table of FIG. 17 regarding the respective ports of the SW, and storing such table in the memory module of the MP, as shown in FIG. 18, characteristics of the path regarding the SW of one module can be set or defined.

The table shown in FIG. 17 relates to the SW 0 of FIG. 18, and, as shown in FIG. 18, shows that the CHA 0 is connected to the port 0, the MP 0 is connected to the port 1, the DKA 0 is connected to the port 2, the CMA 0 is connected to the port 3, the SW 3 of the other module is connected to the port 4, and the SW 1 of the other module is further connected to the port 5. The path status table is set for each switch adapter.

The types of packets that are sendable from the respective ports of the SW are also registered in the path status table. The port 0 is used for sending a reply packet upon receiving a command packet from the CHA 0, the port 1 is used for sending a reply packet upon receiving a command packet from the MP 0, the port 2 is used for sending a reply packet upon receiving a command packet from the DKA 0, the port 3 is used for sending a command packet upon receiving a reply packet from the CMA 0, the port 4 is used for sending a reply packet upon receiving a command packet from the SW 3, and the port 5 is used for sending a command packet to the SW 1.

The direction in which the command packets are to be transferred is shown in FIG. 18. FIG. 18 also shows a case where the MP controls the packet transfer with the SW according to a path status table. The foregoing first packet transfer control rule (FIG. 10) is realized based on the path status table and the MP control based on this table. FIG. 10 showed a case of restricting the direction of the command packet flowing along the path between the SW 24-1 and the SW 24-2. In the case of FIG. 18, this can be realized as a result of the packet type that is sendable from the port 5 being a command packet to the SW 1, and, although not explained in FIG. 17, the destination of the port 1 of the SW 1 is the SW 0, and the sendable packet type thereof is a reply [packet]. The packet type can be detected based on the packet frame. The message packet described later is a non-posted packet and can also be sent to and received from a port connected to the MP, for instance, and is unrelated to a command packet or a reply packet.

The routing table (RT) illustrated in FIG. 5 is now explained in detail. The SW stores the packet received from a certain port in the receive buffer, and decides to which transfer port send buffer the reception packet should be sent to according to the RT. The routing table is set for each port of the SW.

FIG. 19 shows the RT set regarding the reception port 0 to which the CHA 0 of the SW0 depicted in FIG. 18 is connected. The destination address to which the packet should be transferred is configured from a SW# and specific information (ID) of the component. If the SW# of the destination address is SW 0, this is addressed to the target component of the same module, and the packet is routed toward the corresponding transfer port according to the RT.

If the SW# of the destination address is other than SW 0, the packet received by the SW 0 is routed to the port 5 in order to make it head toward the reception port of the SW of the other module. The transfer port of the RT shown in FIG. 19 is consistent with the path status table shown in FIG. 17.

Figure 20:
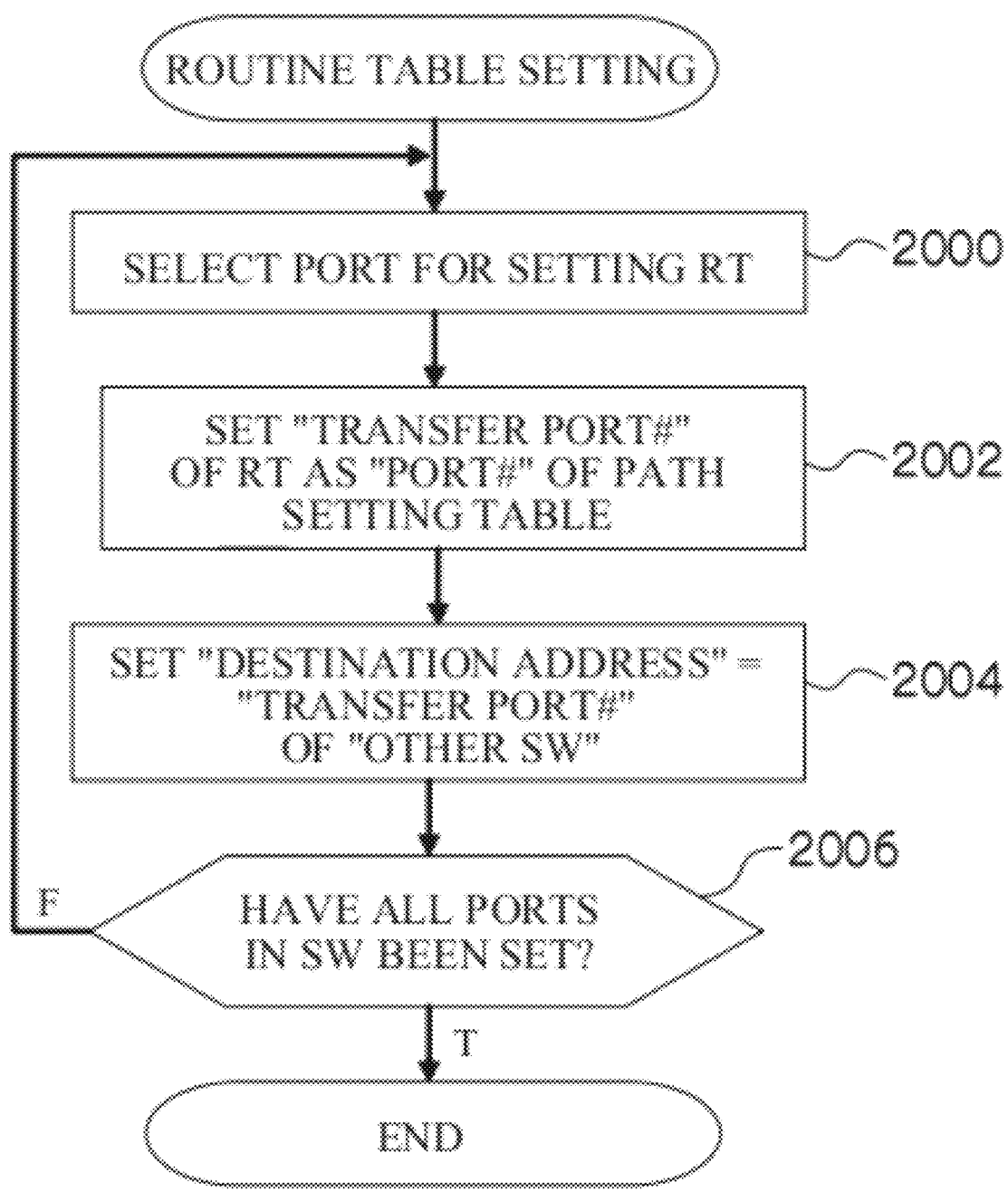
FIG. 20 is a flowchart explaining the operation of a case where the MP of the module to which the SW belongs sets the RT based on the path status table.

FIG. 20 is a flowchart explaining the operation of a case where the MP of the module to which the SW belongs sets the RT based on the path status table. The MP selects a port to be set with the RT from the ports that are not set with the RT (2000).

Subsequently, the MP sets the "transfer port #" of the RT to the "port #" of the path setting table regarding the port in which the "destination" of the path setting table and the "component" of the RT coincide (S2002).

If the sendable packet type of the path setting table of the port set with the RT is "reply," this port with the RT will receive a "command" packet that forms a pair with the "reply." The RT is used for deciding the transfer destination port of this "command" packet. Thus, the MP additionally selects a port # from the path setting table in which the "destination"=SW and the "sendable packet type" is "command," and sets the "destination address" to the "transfer port #" of the "other SW" (2004). If the sendable packet type of the port set with the RT is "command," the port # selected here will be the port # in which the "destination"=SW and the "sendable packet type" is "reply."

Subsequently, the MP determines whether all ports in the SW have been set (2006). If the MP ends the processing for setting the RT upon obtaining a positive result in this determination, and returns to [step 2000] upon obtaining a negative result in this determination.

In FIG. 13 and FIG. 14 described above, the data was temporarily stored in the CMA and the hop count of the command packet or the reply packet was set to "1." The respective MPs of a plurality of modules exchange the message packet and mutually coordinate to realize this packet transfer control rule.

FIG. 21 shows the details of the message format, and the messages include a read (RD) request message (1), a read reply message (2), a write (WR) request message (3), a write reply message (4), and a copy completion message (5).

An msg type refers to the type of message, "to" of the message column shows the MP# of the final destination, and "from" shows the MP# of the message source. The indication of "to" in the "temp" column shows the destination MP# to be passed through upon transferring the message, and "from" shows the source MP# of the message to the MP# of "to."

The indication of "request data" of the read request message (1) shows the logical position of data pertaining to the read request, and is configured from information for specifying the "Logical Device" abbreviated as "LDEV," an LBA (logical block address), and a LEN (data length).

The "data existing address" column of the read reply message (2) shows the address in the CMA of the read data, and is configured from a CMA# (cache memory number), an ADR (address in the memory block of the CMA), and a LEN (data length). The term "copy" means the copying of data to the CMA.

The "request data" of the write request message (3) shows the logical address to which the write data is to be written, and the "data existing address" is the address in the cache memory where the write data is stored.

The "request data" of the write reply message (4) shows the logical address in which the write data was written.

The copy completion message shows the address regarding the other cache memories in which data to be copied to the cache memory exists.

FIG. 22 is an LDEV-DKA table recorded in the memory of the MP. This table is used for defining the relationship of the LDEV number and the logical address of the LDEV storing data, and the DKA for controlling the HDD storing the data.

FIG. 23 is a DKA table showing the correspondence of a PDEV (Physical Device), and an LDEV number with data and a logical address of the LDEV. The control method of FIG. 23 shows the RAID level.

These tables are stored in the memory of the MP. The MP analyzes the write command or the read command from the host, refers to the foregoing tables, and specifies the DKA and PDEV to be accessed.

Figure 24:
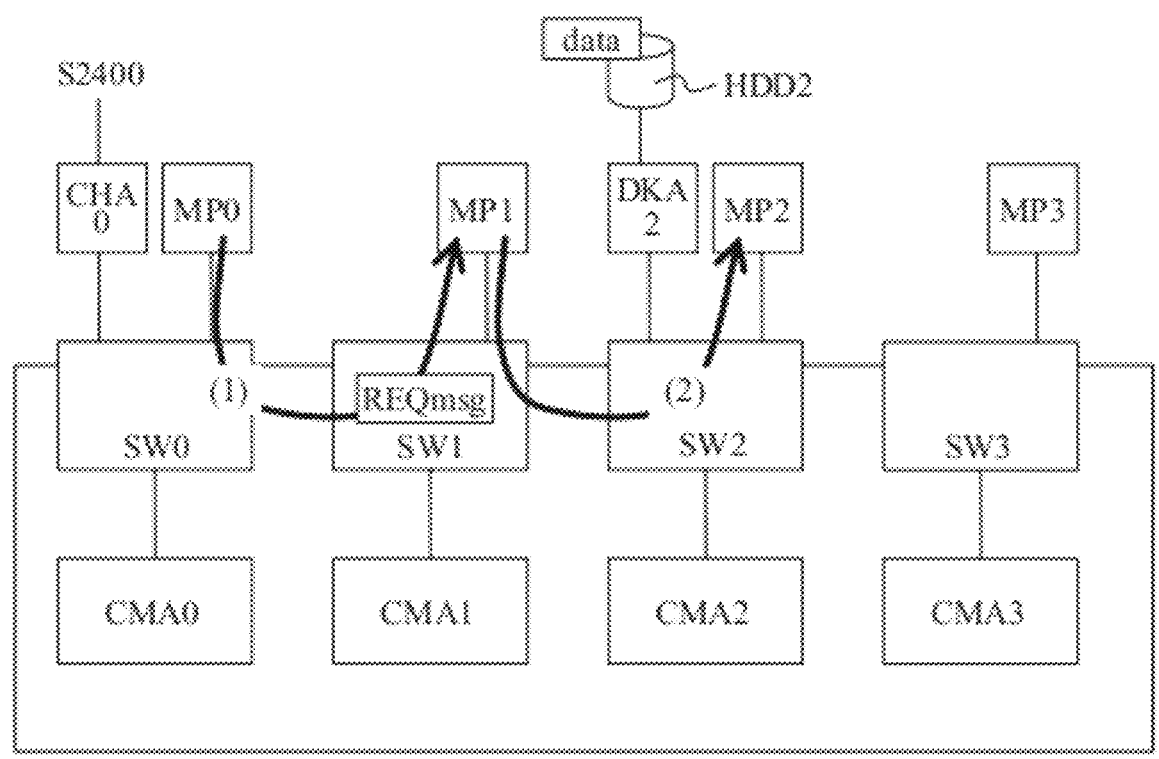
FIG. 24 is a block diagram of a storage subsystem in which the SW of four modules are connected serially.

The operation of the storage subsystem processing a read request from the host computer is now explained in detail. FIG. 24 is a block diagram of a storage subsystem in which the switches of four modules are connected serially.

Figure 25:
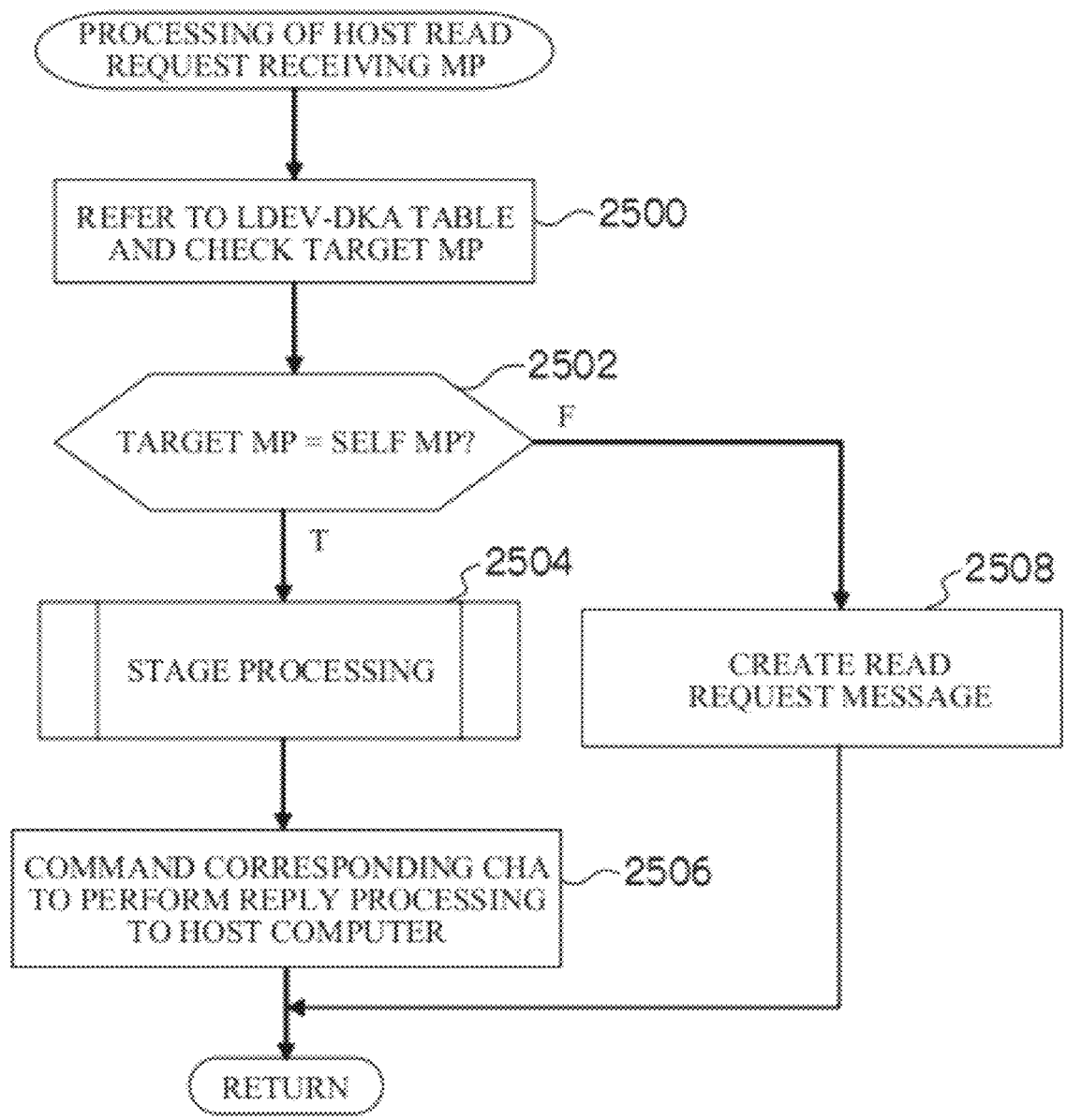
FIG. 25 is a flowchart showing the processing routine to be performed by the host read request reception MP.

When the CHA 0 of the first module receives a read request S2400 from the host computer to the DKA 2 of the third module, the MP 0 of the first module, as shown in the flowchart of FIG. 25, analyzes the command packet from the CHA 0 by referring to the LDEV-DKA table (2500), and checks whether the target MP of the command packet is itself (=MP 0) (2502).

If the target MP is the self MP (MP 0), it stages data from the hard disk under the control of the DKA 0 to the CMA 0 via the DKA 0 connected to the SW 0 (2504). Subsequently, the MP 0 commands the corresponding CHA (CHA 0) connected to the host computer that issued the read command to perform reply processing to the host computer (2506).

Meanwhile, at step 2502, if the MP 0 determines that the target MP of the command packet is an MP of another module, it creates a read request message (FIG. 21(1)) addressed to such other MP (2506).

Upon creating this read request message, the MP 0 refers to the message transfer destination table of FIG. 26. The message transfer destination table registers a final destination MP#, the MP (transfer destination MP#) to be passed through so that the hop count of passing the message through at one time can be reduced, and a hop count in which the message passes through between the final destination MP# and the transfer destination MP#.

When the MP 0 creates a read request message, it sends such read request message to the transfer destination MP#. In FIG. 24, when the MP 0 recognizes that the final transfer destination of the message is the MP 2 (2502 of FIG. 25), it comprehends that the transfer destination MP# in the transfer destination table of FIG. 26 is the MP 1, and creates the read request message shown in FIG. 21(1).

In this read request message, "to" becomes MP 2 and "from" becomes MP 0 in the message column, and "to" becomes MP 1 and "from" becomes MP 0 in the temp column.

Thereby, the read request message (REQmsg) shown in FIG. 24(1) is transferred from the MP 0 to the MP 1. The number of time the message crosses the paths between the switches (remaining hop count) becomes "1" between the SW 0 and the SW 1.

In addition, when the read request message reaches the MP 1, the MP 1 analyzes this read request message, further refers to the message transfer table of FIG. 26, and transfers the read request message (FIG. 24(2)) to the MP 2.

The message transfer destination table is created in advance with a management computer or the like of the storage subsystem, and stored in the memory of the respective MPs.

Figure 27:
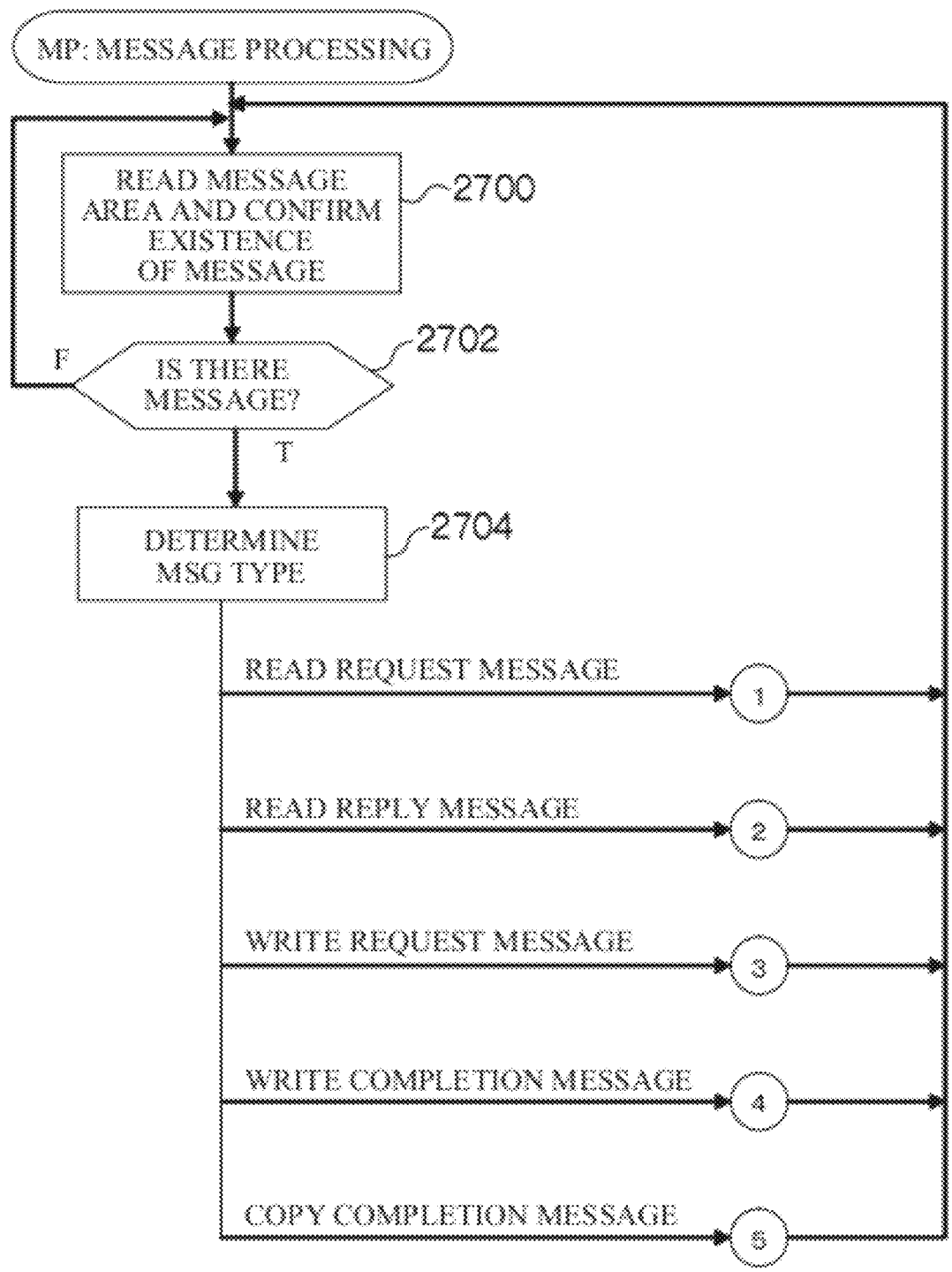
FIG. 27 is a flowchart explaining the message processing to be performed by the MP.

FIG. 27 is a flowchart explaining the message processing to be performed by the MP, and the memory of the MP checks the message area to confirm the existence of a message (2700). Subsequently, the MP determines whether "Is there a message?" (2702), and returns to step 2700 in the case of "there is no message."

Meanwhile, in the case of "there is a message," [the MP] determines whether the type of message (msg) is a read request message, a read reply message, a write request message, a write completion message, or a copy completion message (2704), and processes the respective messages.

Figure 28:
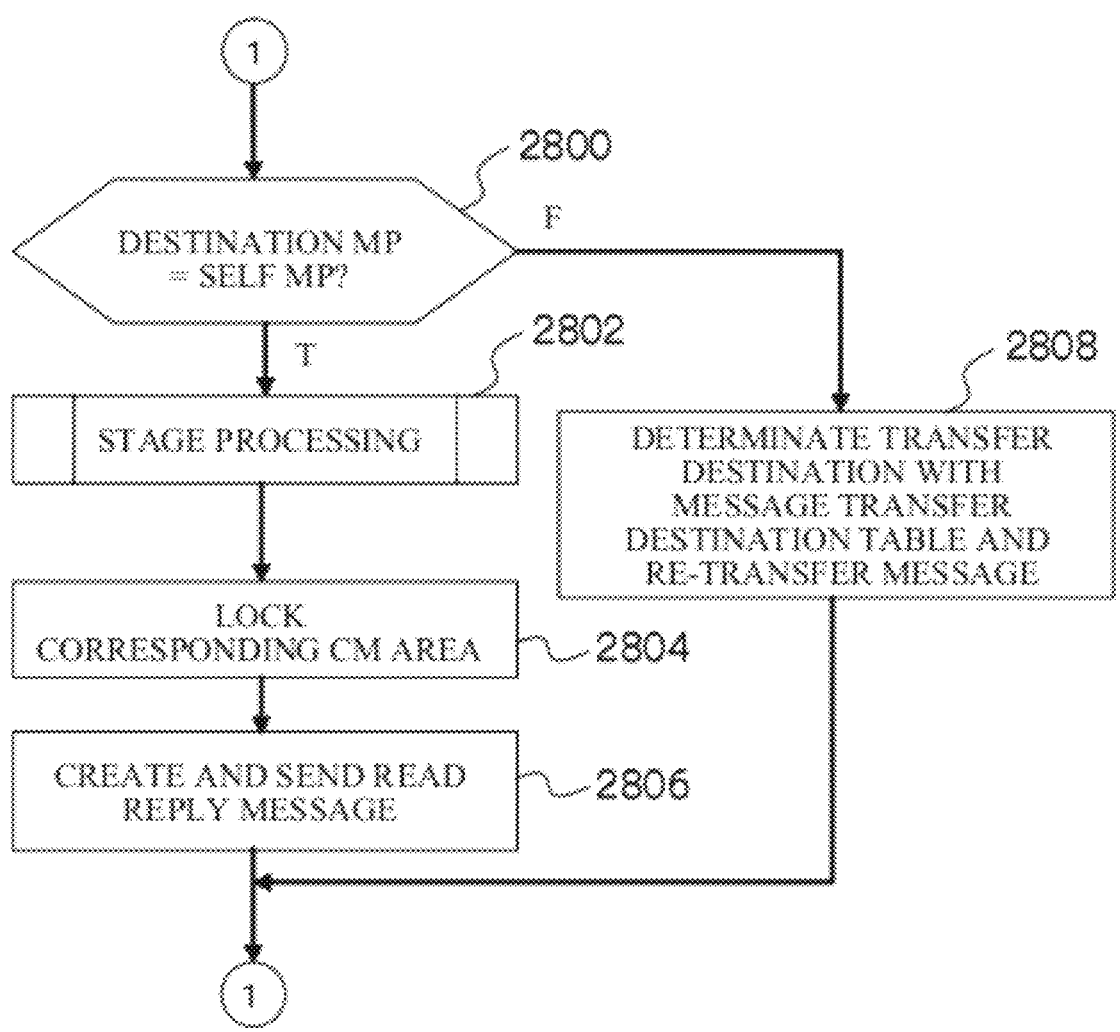
FIG. 28 is a flowchart explaining the read request message processing to be performed by the MP.

FIG. 28 is a flowchart explaining the read request message processing to be performed by the MP. The MP that received the read request message checks whether the MP that is the final destination of the read request message is itself ("to" in the message column of the read request message of FIG. 21(1)) (2800).

If the MP obtains a positive result in this determination, it performs stage processing of read data to the CMA of the same module (2802). Subsequently, the MP locks the area to which the data was staged; that is, the MP disallows the invalidation of that area (2804). The MP thereafter creates a read reply message (FIG. 21(2)) and then sends this to the source MP of the read request message (2806).

The data existing address of the read reply message registers the CMA storing the read data and the data storage area of such CMA. The MP# that received the read request message is registered in "from" of the message column and the MP that received the host read request is registered in "to" of the message column.

At step 2800, it the MP that received the read request message determines that the MP that became the final destination of the read request message is not itself, it re-transfers the read request message (2808). This MP# is registered in "from" and the transfer destination MP# defined in the message transfer destination table is registered in "to" of the temp column of the read request message (FIG. 21(1)).

In FIG. 24, when the MP 1 receives a read request message (1) from the MP 0, since this read request message is addressed to the MP 2, the MP 1 denies the determination at step 2800, proceeds to step 2808, and transfers the read request message to the MP 2 (2808).

Figure 29:
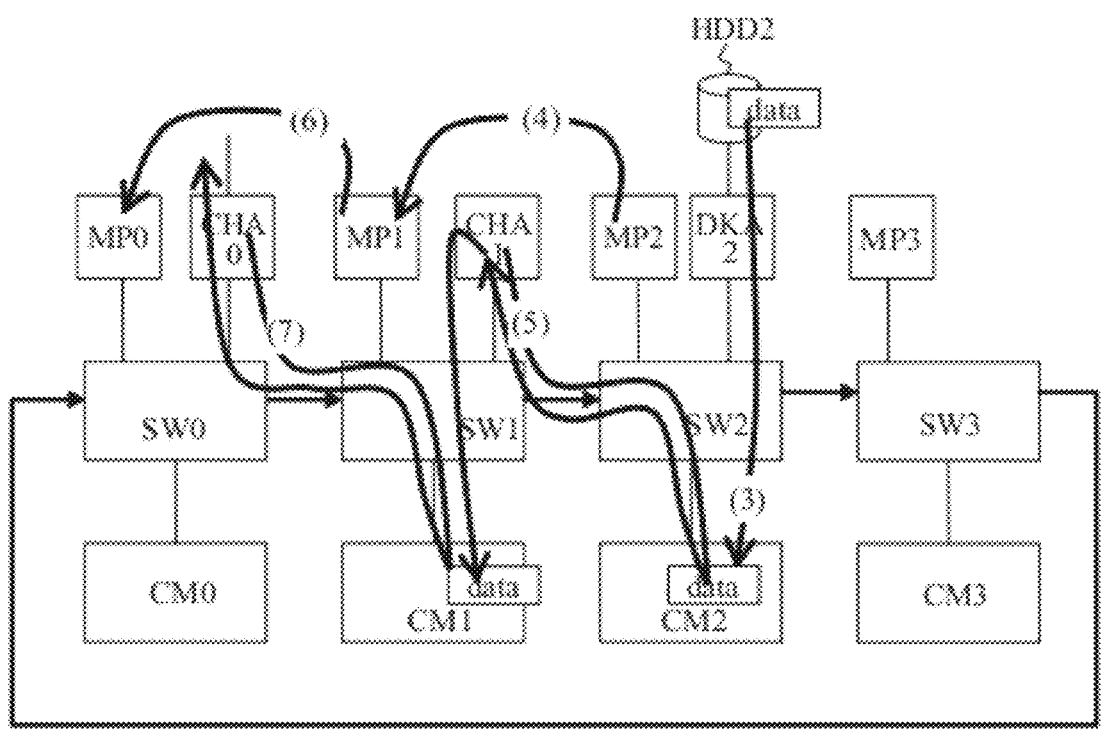
FIG. 29 is a block diagram of a storage system explaining the transmission of a read reply message.

When the MP 2 receives a read request message from the MP 1, since the read request message is addressed to the MP 2, it affirms the determination at step 2800, and, as shown in FIG. 29, at step 2804, the MP 2 secures an area in the CMA 2 for storing data of the HDD 2 obtained with the DKA 2 (FIG. 29(3)). Then, as shown in step 2806, [the MP 2] sends a read reply message to the MP 1, and notifies the master area of the CMA storing the data to the MP 1 (FIG. 29(4)).

MP 0 is registered in "to" of the message column of the read reply message from the MP 2 to the MP 1, and MP 2 is registered in the "from" column. The MP 2 refers to the message transfer destination table, and MP 1 is registered in "to" of the temp column of the read reply message, and MP 2 is registered in the "from" column.

Figure 30:
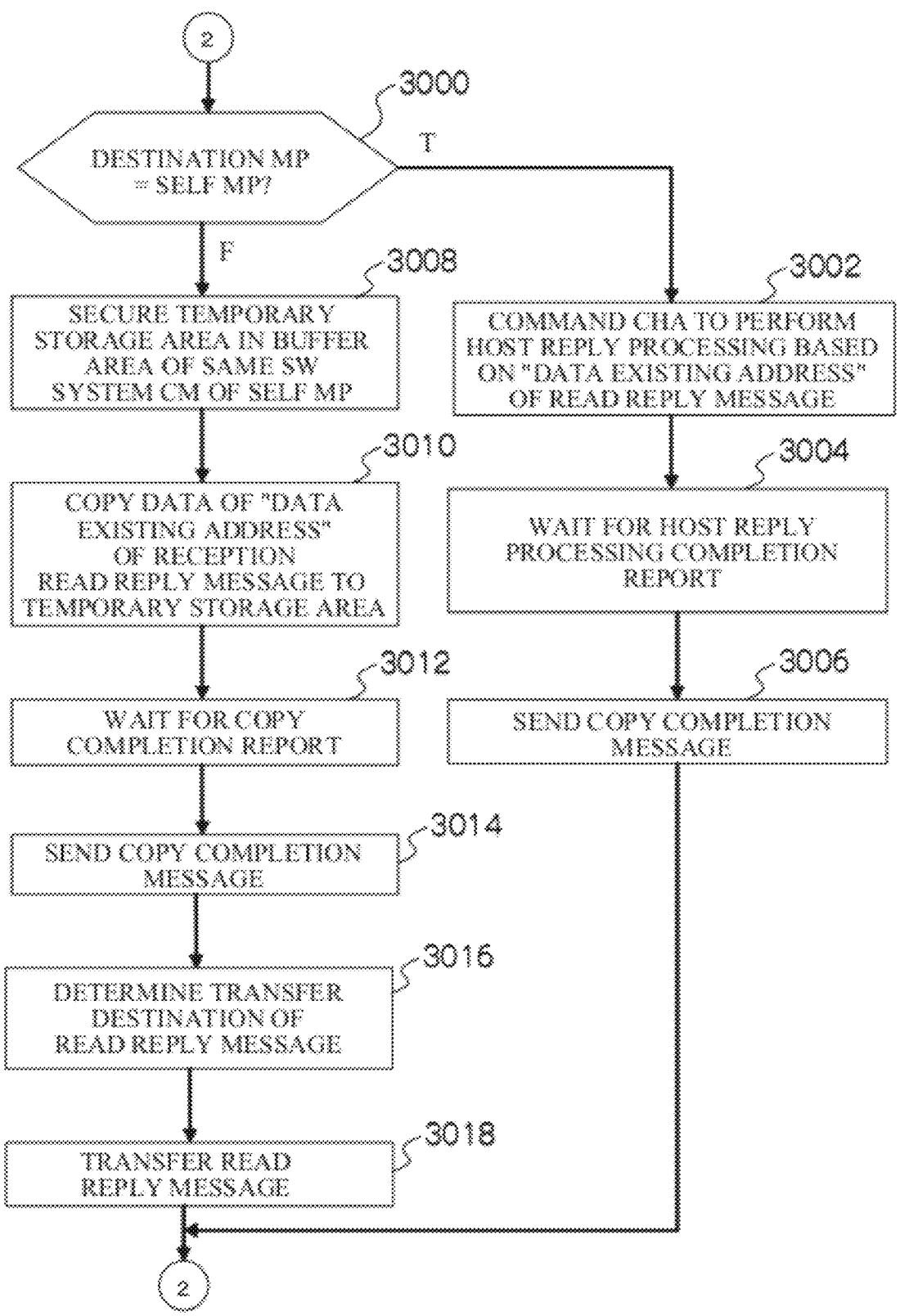
FIG. 30 is a flowchart pertaining to the operation of the MP that received a read reply message.

FIG. 30 is a flowchart pertaining to the operation of the MP that received a read reply message. The MP (self MP) that received the read reply message determines whether the destination MP (MP registered in "to" of the message column) that became the destination of the read reply message and the self MP are the same (3000).

If the self MP obtains a positive result in this determination, there is no need to transfer the read message to another MP, and the [self MP] sends a command packet to the CHA for replying to the host computer, which accessed the CHA of the module of the self MP, regarding the data existing address of the read reply message received by the self MP; that is the area storing the target data (3002).

Subsequently, the self MP waits for the reply packet of the host reply processing completion from the CHA (3004), and, when the self MP receives this reply packet, it sends a copy completion message to the source (MP recorded in "from" of the temp column of the read reply message) of the read reply message (3006).

If the self MP obtains a negative result at step 3000, it secures an area for temporarily storing the target data in a buffer area (memory module) of the CMA of the SW of the same module as the self MP (3008).

The self MP thereafter sends a command packet to the CHA/DKA of the same module so as to copy the data of the data existing address of the received read reply message to the temporary storage area secured at step 3008 (3010). In addition, the self MP waits for a reply packet as the copy completion report from the CHA/DKA (3012).

When the self MP receives the reply packet, it sends a copy completion message to the source (MP recorded in "from" of the temp column of the read reply message) of the read reply message (3014).

Further, the self MP refers to the message transfer table that defines the MP to become the relay in the path or route of the message up to the final MP and decides the transfer destination of the read reply message (3016).

Subsequently, the self MP registers the identifying information of the temporary storage area secured at step 3008 in the data existing address upon transferring the read reply message, records the transfer destination of the read reply message in "to" and registers the identifying information of the self MP in "from" of the temp column (3018).

Following FIG. 24, the status of transferring the read reply message is explained with reference to FIG. 29. Specifically, when the MP 1 receives the read reply message (4) from the MP 2, since this read reply message is addressed to the other MP (MP 0), the MP 1 secures a temporary storage area in the CMA 1, and the CHA 1 copies the target data in the CMA 2 to the CMA 1 (5).

Subsequently, the MP 1 transfers the read reply message to the MP 0 (6). The MP 0 (self MP) that received the read reply message acquires the target data in the CMA 1 through the CHA 0, and transfers this to the host computer.

Figure 31:
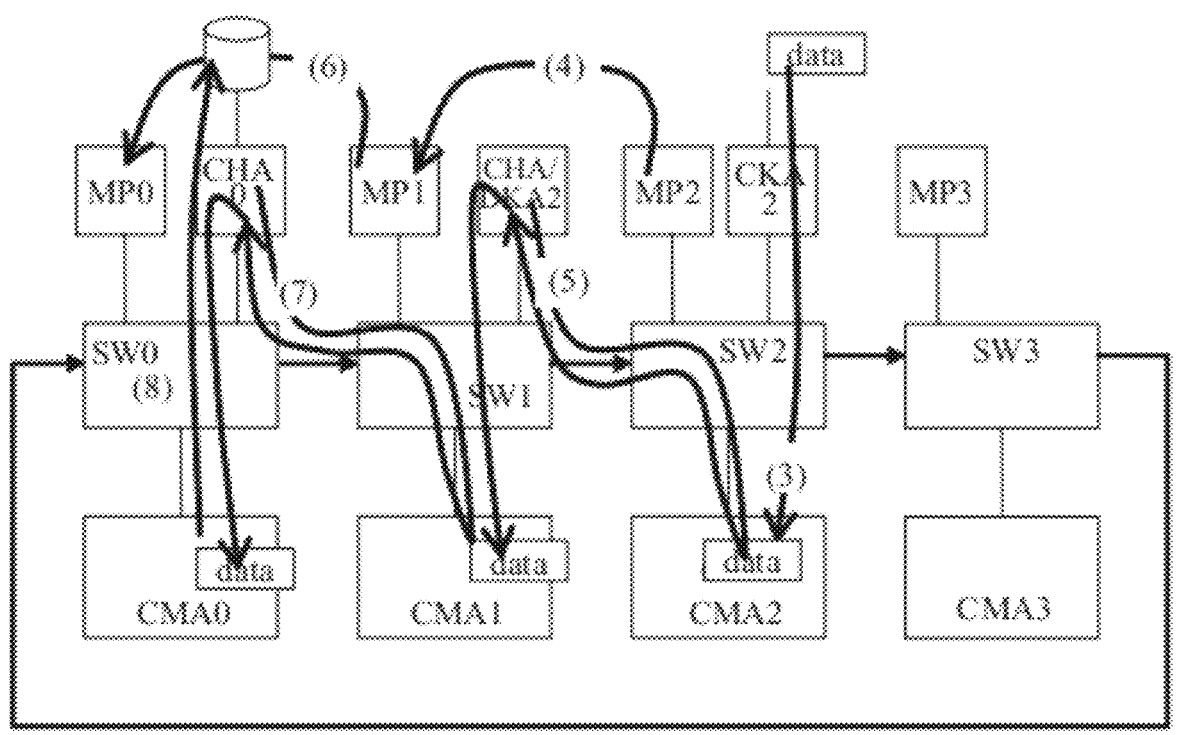
FIG. 31 is a block diagram of a storage subsystem to process a host write access.

The operation in a case where the storage subsystem comprising the grid structure explained with reference to FIG. 24 receives a write request from the host computer is now explained. FIG. 31 is a block diagram explaining this operation. The CHA 2 is receiving a write request from the host computer.

Figure 32:
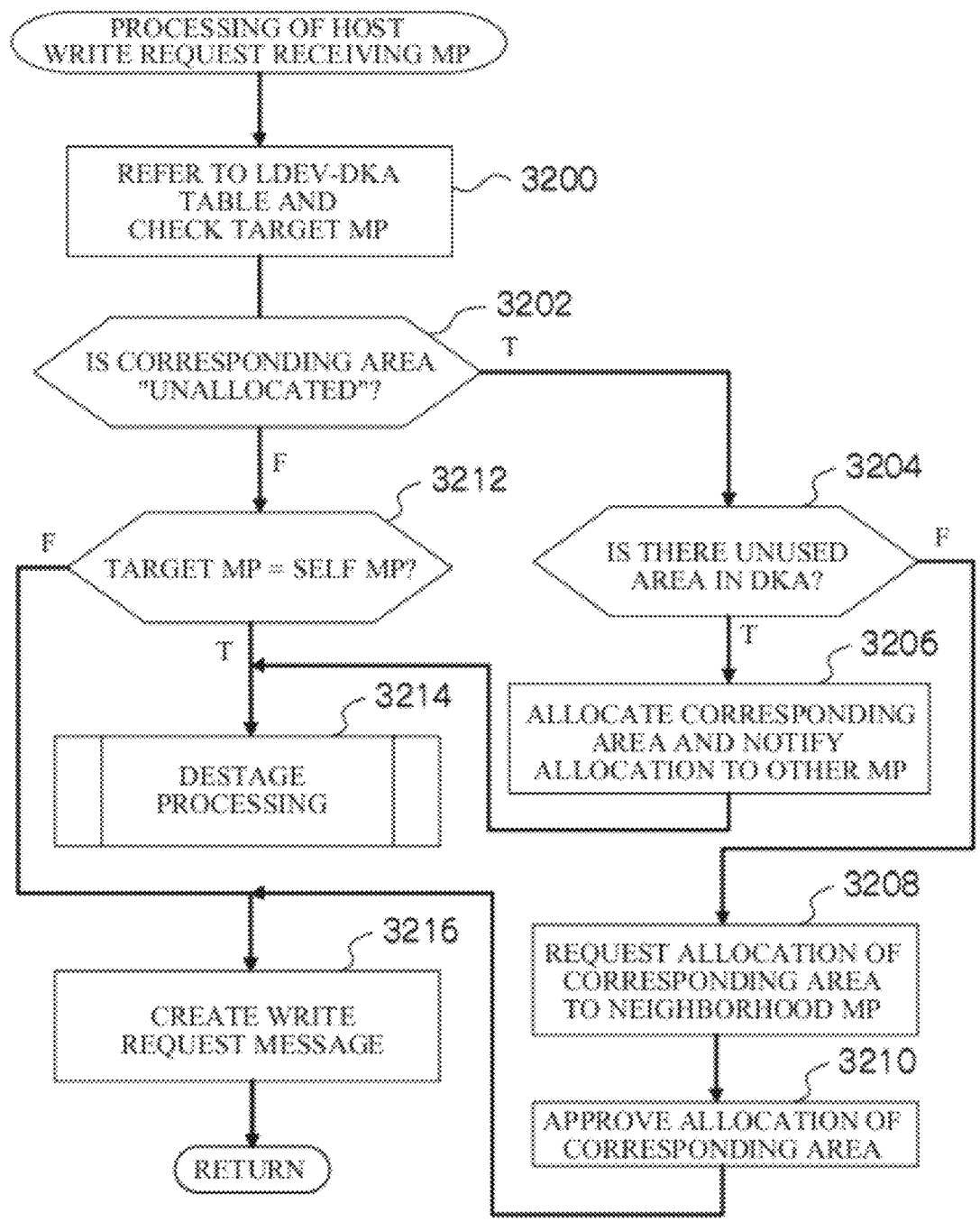
FIG. 32 is a flowchart explaining the operation of the MP that received a host write request.

FIG. 32 is a flowchart explaining the operation of the MP that received a write request from the host computer. The MP refers to the LDEV-DKA table and specifies the DKA to perform processing for storing write data in the hard disk drive, and specifies the MP (target MP) of the same module as this DKA (3200).

Meanwhile, if the write destination LDEV (corresponding area) of the write requested data has not been allocated to the LDEV-DKA table (3202), the self MP refers to the DKA table regarding the DKA connected to the SW of the self MP, and checks whether there is an unused area in the PDEV (3204).

If there is an unused area in the PDEV, the self MP updates the LDEV-DKA table and the DKA table by allocating the LDEV and the LBA (corresponding area) contained in the write request to the DKA table, registers these tables in its memory, and notifies the information concerning such allocation or the updated tables to the other MP (3206).

Subsequently, the self MP performs destage processing for destaging the write data existing in the CMA of the same module from the CMA to the hard disk under the control of the DKA based on the DKA of the same module (3214).

At step 3202, if the write destination LDEV (corresponding area) of the write requested data has been allocated to the LDEV-DKA table, whether the self MP is the target MP is determined (3212), and, if the self MP is the target MP, the destage processing is performed in the same manner as described above. Meanwhile, if it is determined that the self MP is not the target MP at step 3212, a write request message (FIG. 21(3)) is created by referring to the message transfer table, and this is transferred to the transfer destination MP (3216). This write request message is created in the same manner as the foregoing read request message.

At step 3204, if the self MP determines that there is no unused area in the DKA of the self MP, the self MP issues a command requesting the allocation of the corresponding area to an MP of a closer module (3208).

The self MP checks the reply packet from the MP that received the request, and contacts the other MPs for each module in the order closest to the self MP until the allocation of the corresponding area is achieved; for instance, initially in the range that can be accessed without requiring any copying, subsequently in the range that can be accessed with performing copying once, and so on.

The other MP that approved the request from the self MP updates its own tables, and notifies such update to the other MPs (3210). Then, the self MP creates a write request message and sends this to the MP that approved the allocation of the corresponding area.

Figure 33:
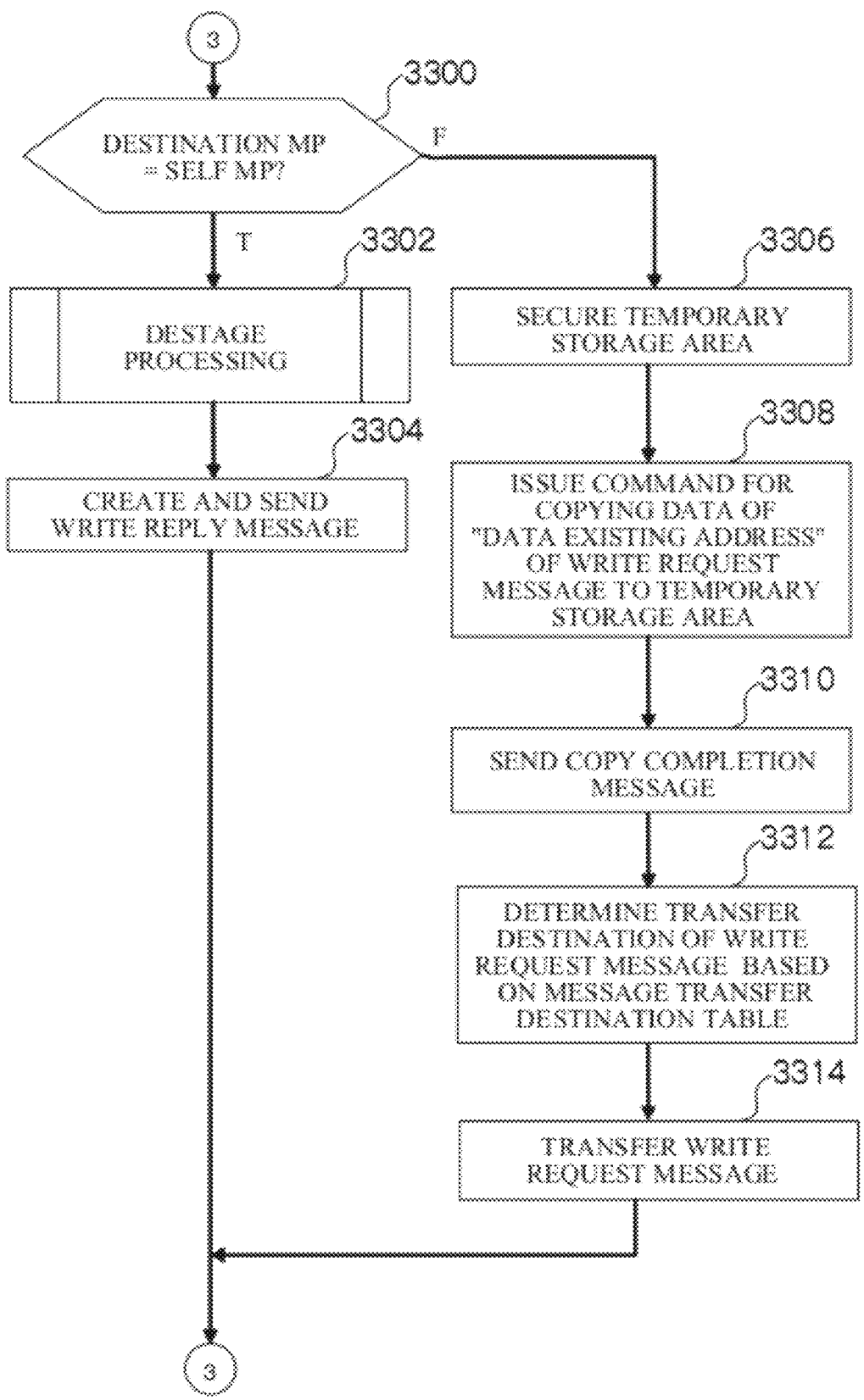
FIG. 33 is a flowchart showing the processing operation of the MP that received a write request message.

FIG. 33 is a flowchart showing the processing operation of the MP that received a write request message. The MP that received the write request message checks whether the write request is addressed to the self MP or another MP (3300).

If the destination MP is determined to be the self MP, write data existing in the CMA is destaged from that CMA of the same module as the self MP to the HDD under the control of the DKA (3302).

Upon performing this destage processing, the self MP copies the data of the data existing address of the write request message to the CMA of the same module via the CHA/DKA.

Subsequently, the self MP creates a write reply message (3304). Request data of the write request message is registered in the request data of the write reply message (FIG. 21(4)), self MP is recorded in "from" of the message column, and MP recorded in "from" of the message column of the write request message is recorded in "to" of the message column.

Meanwhile, if it is determined that the destination MP is not the self MP, the self MP secures an area for temporarily storing the write data in the CMA of the same module (3306).

Subsequently, the self MP reads the data from the data existing address of the received write request message, and sends a command packet to the CHA of the same module so as to copy the data to the temporary storage area at step 3306 (3308).

The self MP thereafter sends a copy completion message to the source (temp from) of the received write request message (3310). Here, the self MP records self MP in "from" and records the source (temp from) of the write request message in "to" of the temp [column] of the copy completion message (FIG. 21(5)), and records the data existing address in the temporary storage area at step 3306.

Subsequently, the self MP refers to the message transfer table in order to transfer the write request message to another MP, and decides the transfer destination MP of the write request message (3312).

Upon transferring the write request message, the self MP records the data existing address in the temporary storage area at step 3306, and records self MP in "from" and transfer destination MP in "to" of the temp column.

Figure 34:
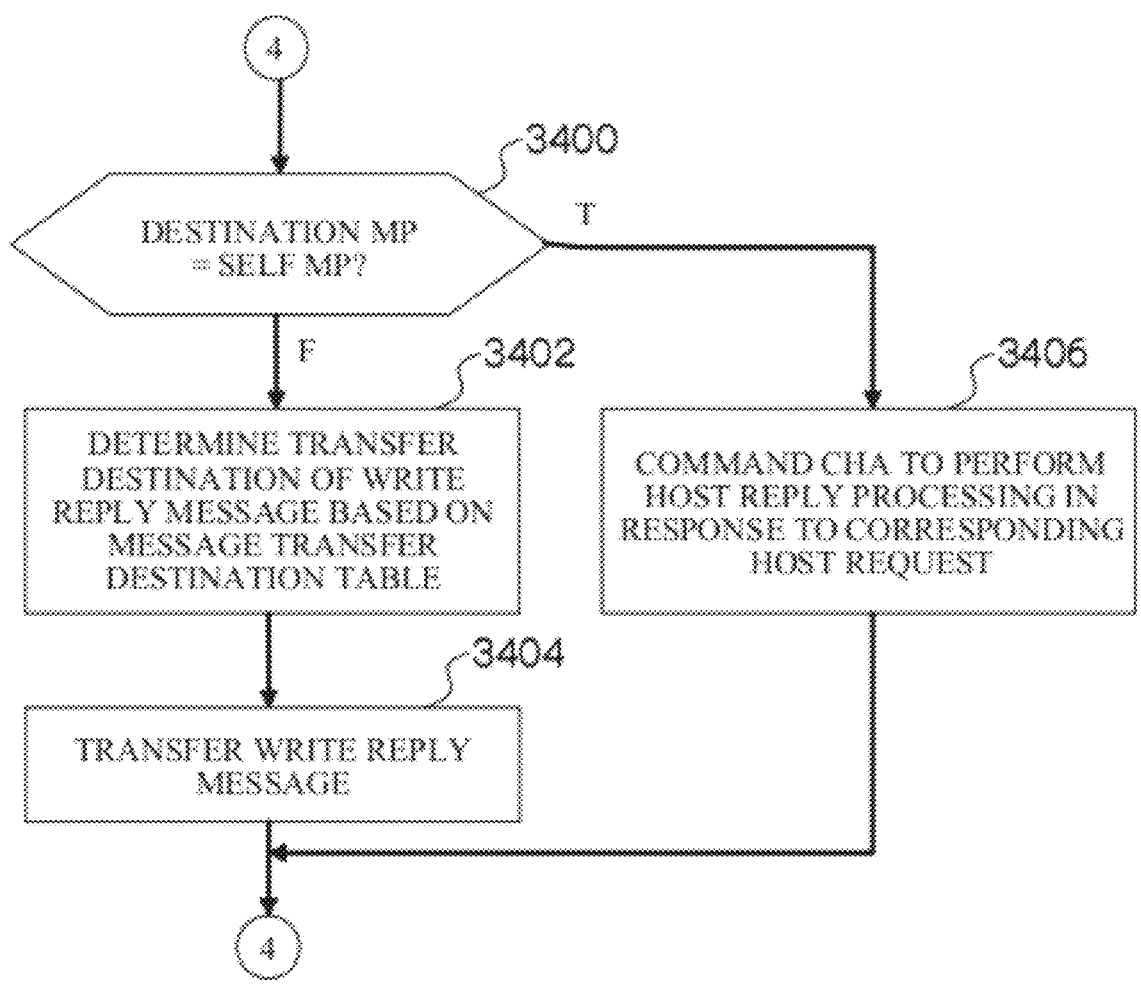
FIG. 34 is a flowchart showing the operation of the MP that received a write reply message.

FIG. 34 is a flowchart showing the operation of the MP that received a write reply message created at step 3304 of FIG. 33. The self MP that received the write reply message checks whether it is the transfer destination MP (destination MP) in the write reply message (3400).

When it is determined that the self MP is not the destination MP, [the self MP] refers to the message transfer destination table and decides the transfer destination of the write reply message (3402). Subsequently, the self MP records self MP in "from" and transfer destination MP in "to" of the temp column of the write reply message, and thereby transfers the write reply message (3404).

If the self MP is determined to be the destination MP at step 3400, [the self MP] issues a command to the CHA of the same module as the self MP for issuing a reply frame indicating the completion of the write processing in response to the (corresponding request) from the host computer to such CHA (3406).

As shown in FIG. 31, when the CHA/DKA 2 receives a write request from the host computer, it secures a storage area for the write data in the CMA 2, and notifies the host computer that the preparation for data transfer is complete. Then, the CHA 2 receives data from the host computer, and transfers this to the CMA 2 (3).

When the MP 2 receives the write request, it creates a write request message addressed to the MP 0 of the same module as the data write destination DKA 0, and sends this to the MP 1 upon referring to the message transfer destination table (4). The MP 1 will know the master area (data storage destination address) of the CMA 0 based on the write request message.

The MP 1 that received this write request message secures a temporary storage area in the CMA 1 of the same module since the message is addressed to the MP 0, and commands the CHA/DKA 1 to copy the write data of the CMA 2 to the CMA 1. The CHA/DKA 1 that copied (5) the write data from the CMA 2 to the CMA 1 notifies the MP 1 and the MP 2 that the copy is complete.

The MP 1 transfers the write request message to the MP 2 since the destination MP of the write request message from the MP 2 is the MP 0 (6). The MP 2 will thereby know the storage area of the data of the CMA 1, and the MP 2 commands the CHA/DKA 0 to copy the data of the CMA 1 to the CMA 0 (7).

When the CHA 0 completes this copy, it notifies the same to the MP 1 and the MP 0. The MP 0 sends a command packet to the DKA 0 for destaging the write data of the CMA 0 to the HDD 0.

The MP 0 creates a write reply message, and sends this to the MP 1 via the SW 1. The MP 1 transfers the write reply message to the MP 2 via the SW 2. The MP 0 should return a write reply frame to the host computer via the CHA 2 after the MP 2 receives the write reply message.

Since the message hop count is restricted to "1" in FIG. 24, FIG. 31 and so on, even if a request frame is supplied from the host computer to at least one module among the second module, the third module, and the fourth module of the storage subsystem in a similar manner as the first module, it is possible to prevent the occurrence of a deadlock of the packet.

Figure 35:
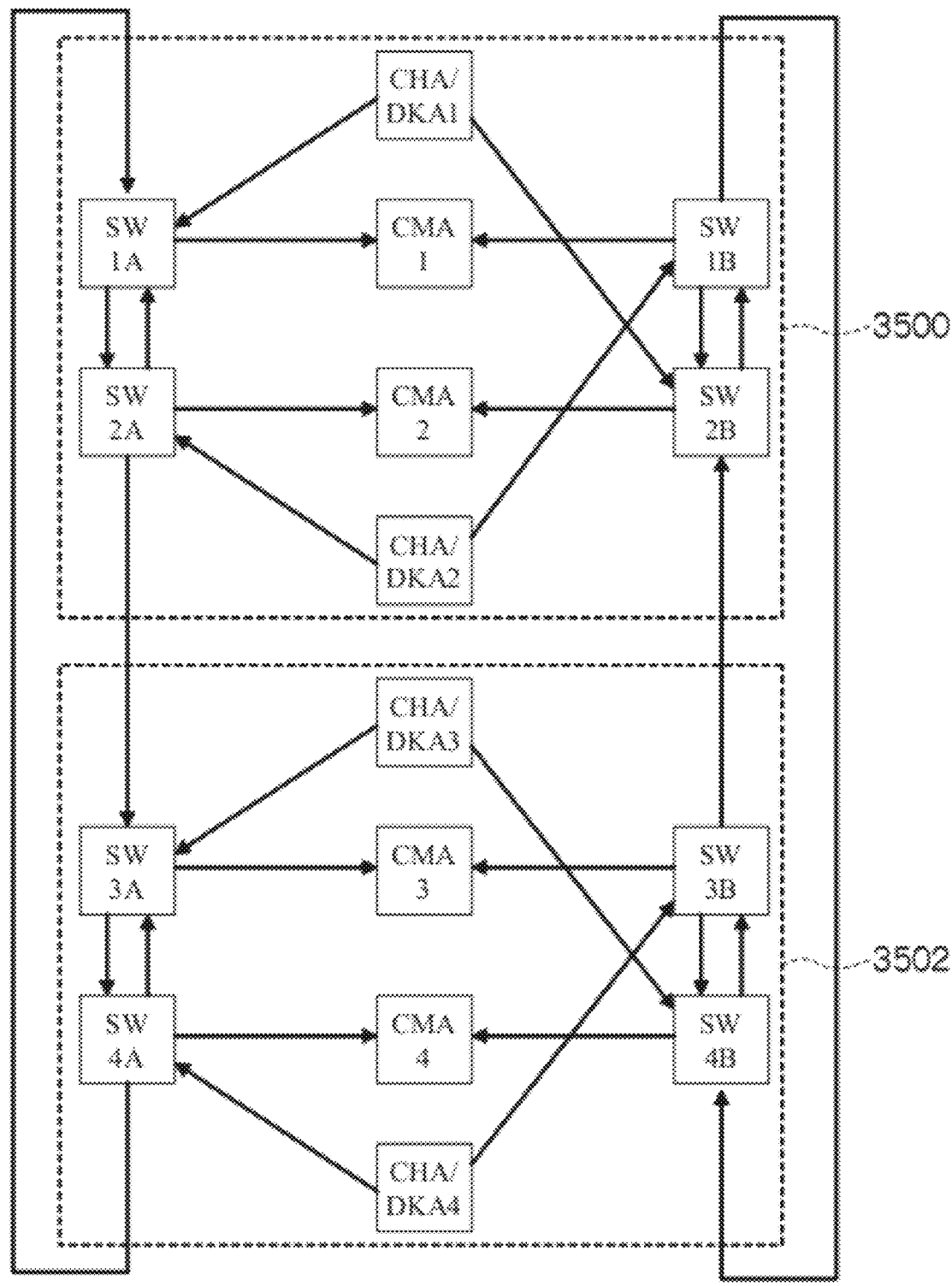
FIG. 35 is a block configuration of a storage subsystem in which the switch configuration is made redundant.

FIG. 35 is a block configuration of a storage subsystem in which the switch configuration, the cache memory, and the CHA/DKA are made redundant. This storage subsystem comprises two modules 3500 and 3502, each module is connected with a path of the switches.

The module 3500 comprises a CHA/DKA 1, a CMA 1, a CMA 2, a CHA/DKA 2, first redundant system switches (SW 1A and SW 2A), and second redundant system switches (SW 1B and SW 2B).

The CHA/DKA 1, the CMA 1, the CMA 2, and the CHA/DKA 2 are connected to the first redundant system (A system) switch and the second redundant system (B system) switch as shown with the arrows.

The CHA/DKA 1 and the CHA/DKA 2 can respectively be connected to the CMA 1 or the CMA 2 via either the first redundant system switch or the second redundant system switch. In other words, an alternate path structure is realized. The direction of the arrows shows the transfer direction of the command packets. The switches of the same redundant system (SW 1A-SW 2A, SW 1B-SW 2B) are connected via two paths.

The module 3502 is also configured as illustrated in a similar manner as the module 3500. The switches of the same redundant system are connected with one path between the modules 3500 and 3502. In other words, the SW 2A and the SW 3A are connected with one path, and the SW 4A and the SW 1A are similarly connected with one path. The redundant system switches of the B system are configured the same.

FIG. 35 does not show the MP for simplification of the diagram. In reality, the MP may be connected in the same manner as the CHA/DKA, or the CHA/DKA may be additionally equipped with the MP function and carry out such function on behalf of the MP. The case explained here adopts the latter example.

Although FIG. 35 integrally indicated the CHA and the DKA as CHA/DKA for the sake of convenience, the CHA and the DKA may be realized with the same circuit, or respectively realized with separate circuits.

The definition of components and the connection switch is based on the connection table of FIG. 36. This connection table is set in the respective memories of the CHA/DKA 1, the CHA/DKA 2, the CHA/DKA 3, and the CHA/DKA 4. The inter-switch hop count tolerated against the command packet from the switch to become the origin is defined in the control table of FIG. 37.

For example, since the command packet from the SW 1A is allowed two hops, the writing of data from the CHA/DKA 1 into the CMA 3 can be performed at once from the SW 1A to the SW 3A via the SW 2A without having to redirect (copy) the data to the CMA midway.

Meanwhile, if the redundant system B is used for writing data from the CHA/DKA 1 into the CMA 3, since the direction of the command packet tolerated between the switches of different modules is the opposite of the redundant system A, three hops from the SW 2B to the SW 1B, from the SW 1B to the SW 4B, and from the SW 4B to the SW 3B will be required. Thus, the CHA/DKA 3 needs to once copy data from the SW 4B to the CMA 4, subsequently read the data from the CMA 4 and send it from the SW 4B to the SW 3B, and then the CHA/DKA 4 needs to copy this data to the CMA 3. Thus, the A system is used for writing the data from the CHA/DKA 1 into the CMA 3.

The reason why the tolerable hop count is set to "2" in the SW 1A and the tolerable hop count is set to "1" in the SW 2A is because, since the command packet can be sent bi-directionally along two paths between the SW 1A and the SW 2A, as shown in FIG. 10, this will not become a cause for generating a deadlock. Meanwhile, since the path between the SW 2A and the SW 3A crossing different modules is configured from one path, the sending of packets originating from the SW 2A is restricted to one hop between the SW 2A and the SW 3A from the perspective of preventing a deadlock. The same applies to the other switches.

The source SW, the destination SW, the next SW of the source SW, the hop count from the source SW to the destination SW, and the redirect count based on the tolerable hop count of FIG. 37 are summarized as the topology table (FIG. 38), and stored in the memory of the CHA/DKA. Moreover, which redundant system is to be used for transferring the packet upon transferring the packet from the source (CHA/DKA) to the destination (CMA) is summarized as the transfer use redundant system table (FIG. 39).

Figure 40:
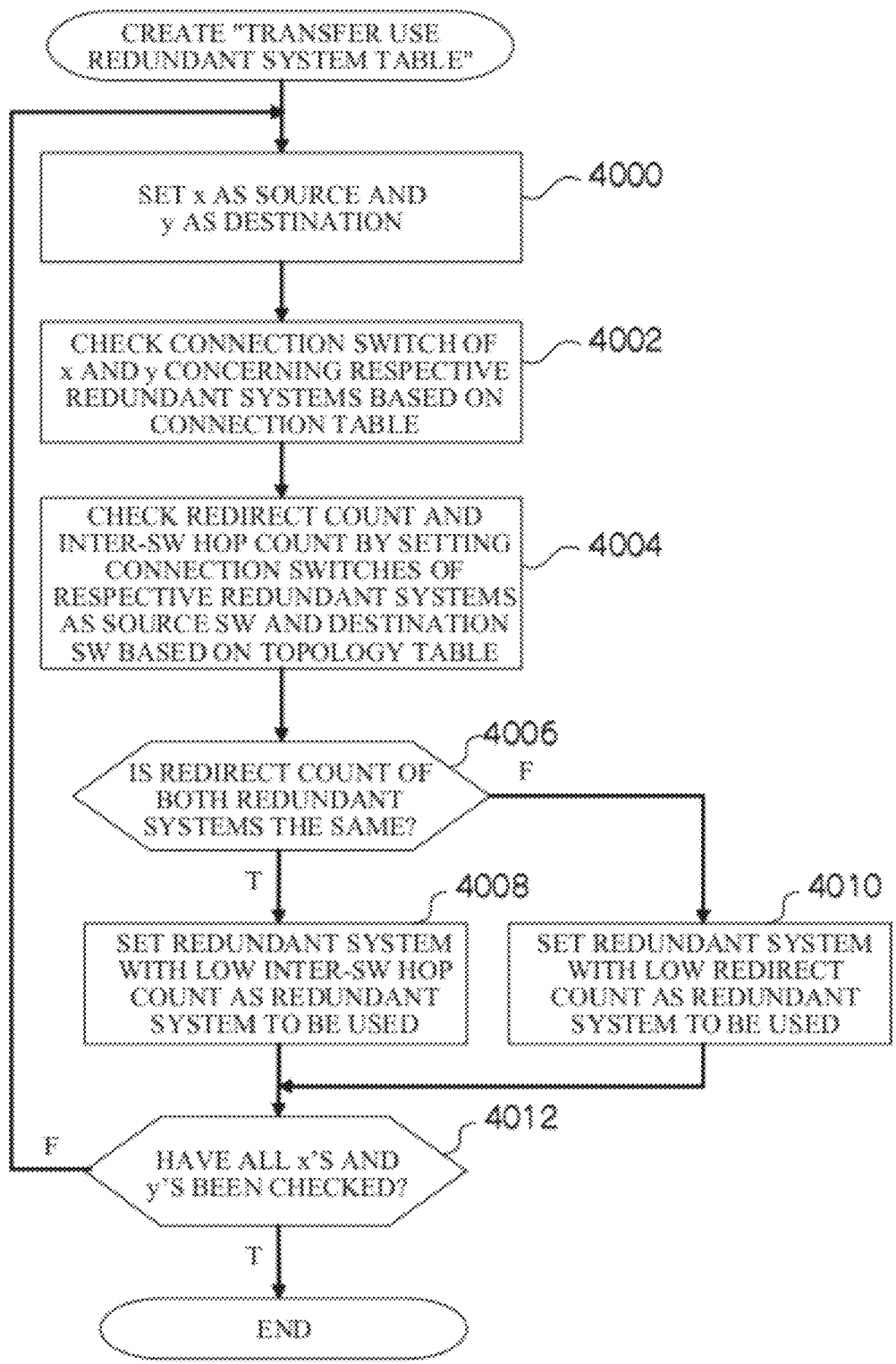
FIG. 40 is a flowchart for creating a transfer use redundant system table.

FIG. 40 is a flowchart for creating a transfer use redundant system table. This flowchart is executed by the management computer of the storage subsystem. The management computer sets x as the packet source component, and y as the packet destination component (4000).

Subsequently, the management computer checks the connection switch of x and y regarding the respective redundant systems based on the connection table of FIG. 36 (4002). The management computer checks the redirect count and hop count between the source SW and the destination SW by setting x as the source SW and y as the destination SW regarding the respective redundant systems based on the topology table of FIG. 38 (4004).

Subsequently, the management computer checks whether the redirect count of both redundant systems is the same (4006), and, if the redirect count is the same, it uses the redundant system with a lower hop count between the switches for transferring the packets (4008).

Meanwhile, if the redirect count of both redundant systems is not the same, it uses the redundant system with a lower redirect count (4010). [The management computer] thereafter checks whether all x's and y's have been checked (4012), and ends the flowchart upon obtaining a positive result, and returns to step 400 upon obtaining a negative result. If the redirect count and the hop count are the same in both redundant systems, either redundant system switch may be used for the packet transfer.

Figure 41:
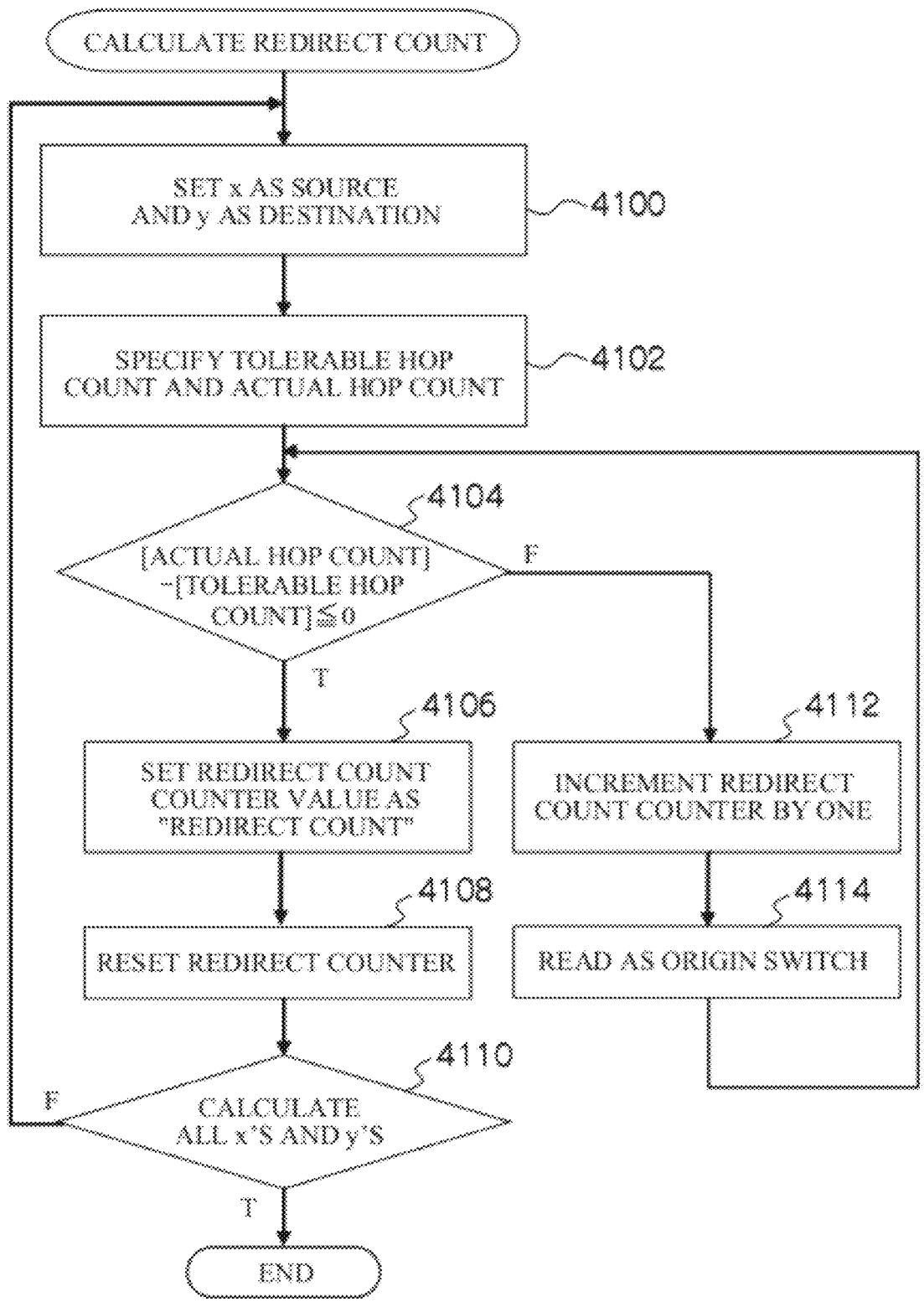
FIG. 41 is a flowchart showing the details for calculating a redirect count.

FIG. 41 is a flowchart showing the details for calculating a redirect count with the management computer. The management computer sets x as the packet source component, and y as the packet destination component, and checks the connection switch of x and y regarding the respective redundant systems based on the connection table (4100).

The management computer refers to the tolerable hop count table (FIG. 37), and specifies the tolerable hop count of the SW to become the source (origin) in the packet transfer. Subsequently, [the management computer] specifies the actual hop count between the source SW and the destination SW based on the topology table (4102).

Subsequently, the management computer subtracts the tolerable hop count from the actual hop count, and checks whether the result is 0 or less (4104). If the subtraction result is 0 or less, the value of the redirect count counter is registered as the "redirect count" in the topology table of FIG. 38 (4106). The tables of FIG. 36 to FIG. 39 may also be set in the memory of the management computer.

The redirect counter is also set in the memory of the management computer. The initial value of the redirect counter is "0."

After the redirect counter value is registered in the topology table, the counter is reset (4108), and the redirect count of the subsequent x and y is calculated (4110).

Meanwhile, if the subtraction result at step 4104 is 1 or greater, the redirect counter value is "incremented by 1" (4112). Subsequently, the "next SW" of the topology table is read as the origin SW (4114), the tolerable hop count is subtracted from the actual hop count, and whether the subtraction result is 0 or less is checked.

The foregoing steps are executed until all x's and y's have been checked (4110).

Figure 42:
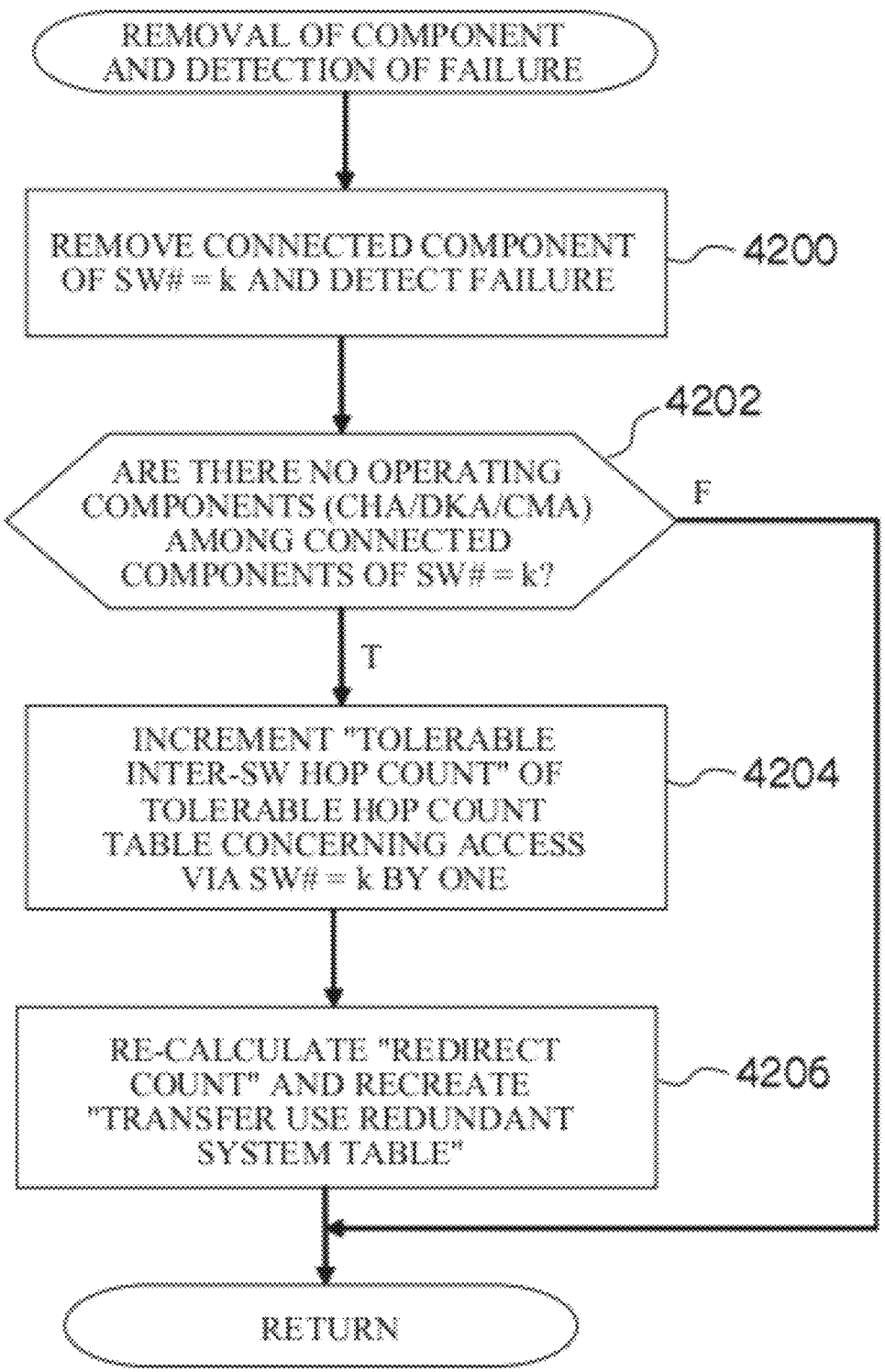
FIG. 42 is a flowchart explaining the correction processing for relaxing the inter-switch hop count when removing the component to be connected to the SW from the switch, or when the component is subject to a failure.

FIG. 42 is a flowchart explaining the correction processing upon detecting the removal the component to be connected to the SW from the switch, or a failure in the component. When the management computer detects the "removal" or "failure" regarding a component to be connected to the SW# (=K) (4200), it checks whether that component connected to the SWk is operating (4202).

When a positive result is obtained in this determination, since this means that a command from the components will not be input to the SWk, the possibility of a deadlock occurring will be low. Thus, the tolerable hop count between the switches with the SWk as the origin SW is incremented by one in the tolerable hop count table (4204).

Subsequently, the management computer recalculates the redirect count with the SWk as the transfer source SW, and recreates the transfer use redundant system table (4206).

Meanwhile, at step 4202, if there is an operating component that is connected to the SWk, since the packet to this component may cause a deadlock, the processing of step 4204 and step 4206 is cancelled.

Although FIG. 40 to FIG. 42 explained a case where the management computer executes the processing steps, each MP or CHA/DKA may also retain copies of the tolerable hop count table and the like and respectively execute the processing steps while referring to such copies.

The storage subsystem shown in FIG. 35 is also able to access any CMA from the CHA/DKA without having to once copy data to the CMA during the packet transfer process by properly using the redundant systems based on the used redundant system table in the packet transfer from the transfer source SW to the transfer destination SW.

Meanwhile, when a failure occurs in a certain SW of the redundant system, it will be possible to access any CMA from the CHA/DKA by using an alternate system path by copying data to the CMA during the process of the packet transfer.

Figure 43:
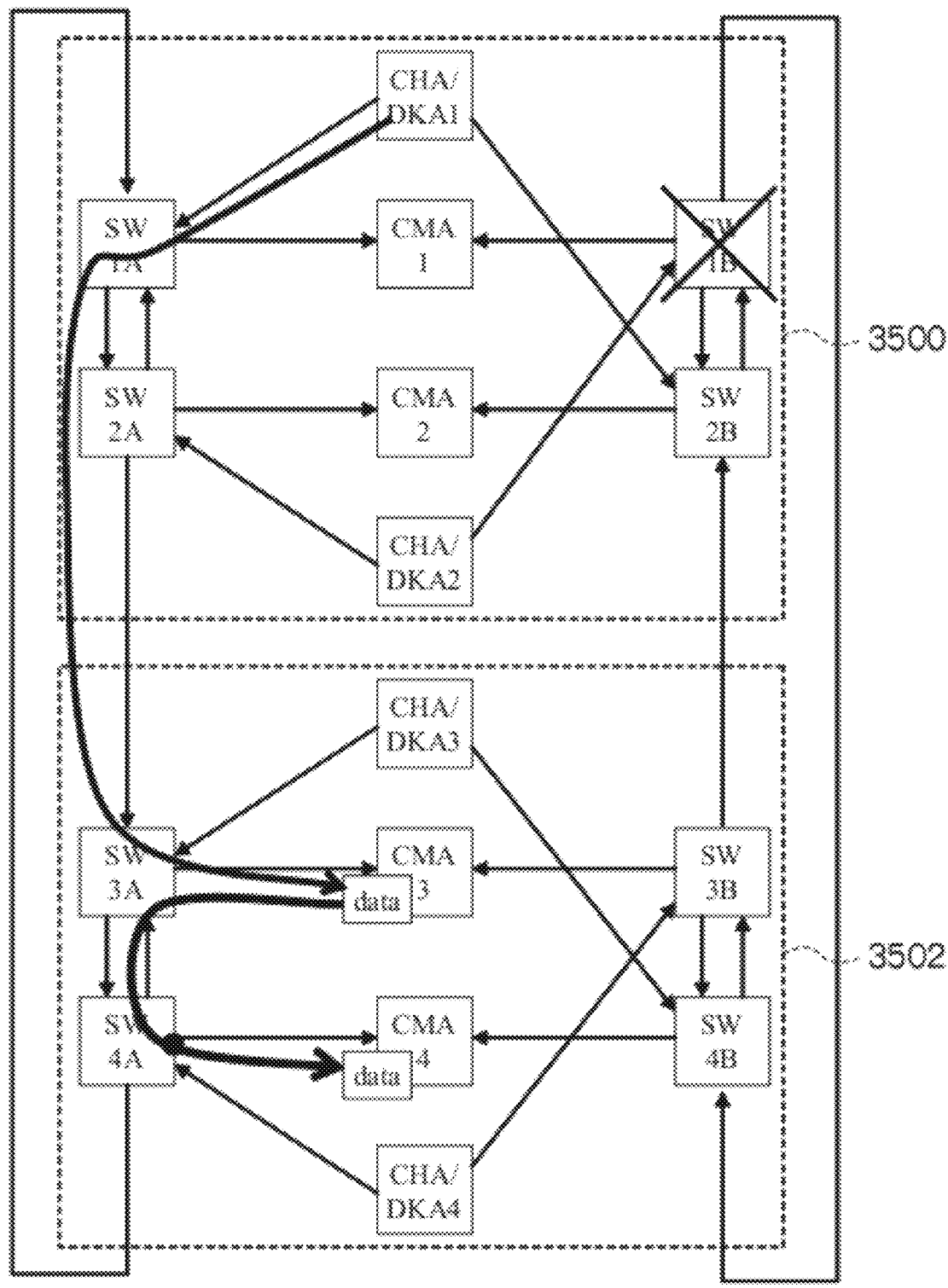
FIG. 43 is a block diagram of a storage subsystem explaining the packet transfer in a case where one redundant system switch is subject to a failure.

FIG. 43 is a block diagram of a storage subsystem explaining the packet transfer in a case where the SW 1B of the used redundant system B is subject to a failure when the CHA/DKA 1 is to access the CMA 4.

Since the redundant system A is used for the access from the CHA/DKA 1 to the CMA 4 and the SW 1A is allowed to make up to two hops, the packet is made to hop twice from the SW 1A to the SW 3A.

The CHA/DKA 3 once redirects the data from the SW 3A to the CMA 3, and the CHA/DKA 4 reads the data from the CMA 3 and copies such data to the CMA 4.

Thereby, if the redirecting of data is approved, even if a failure occurs in the SW of one of the redundant systems, the CHA/DKA (MP) will be able to access the target component (CMA) from the other redundant system.

A modified example of FIG. 35 is now explained with reference to FIG. 44. The embodiment of FIG. 44 differs from the embodiment of FIG. 35 in that the power source is duplexed as a power source A and a power source B, the power source A supplies power to the switch of the redundant system A, the power source B supplies power to the redundant system B, and the respective CMAs are additionally duplexed in accordance with the arrangement of the power sources. The CMA 1 is additionally duplexed as a CMA 1A and a CMA 1B, the CMA 1A is supplied power from the power source A, and the CMA 1B is supplied power from the power source B. The SW 1A and the SW 1B are respectively connected to the CMA 1A and the CMA 1B. The other CMAs and switches are also configured similarly as shown in FIG. 44.

Figure 44:
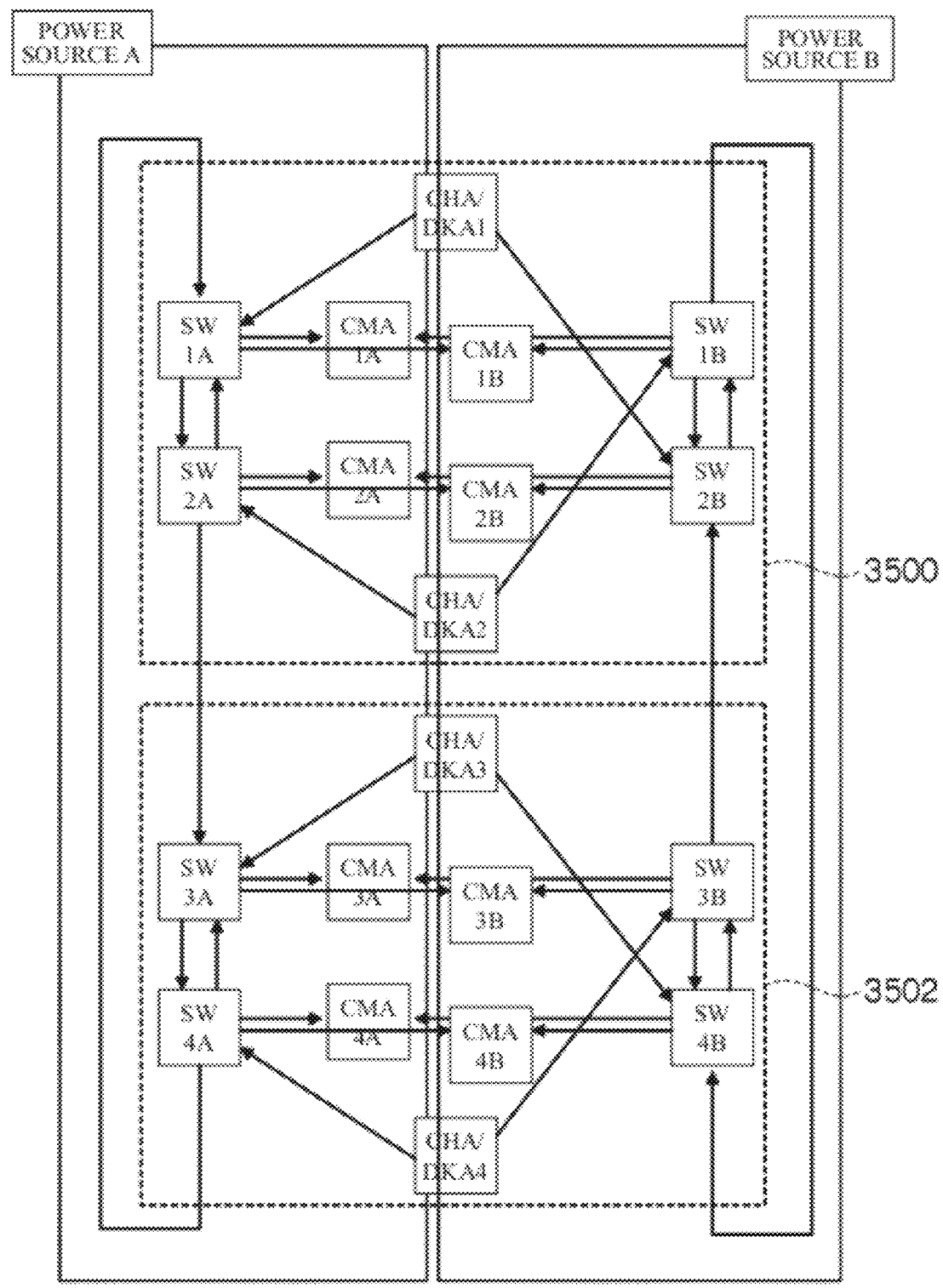
FIG. 44 is a block diagram pertaining to a modified example of FIG. 35.

According to FIG. 44, even if one of the power sources fails, since the write data from the host system is stored in both CMAs that were additionally duplexed, the write data will not be lost even if such write data is not stored in the primary storage apparatus HDD.

Figure 45:
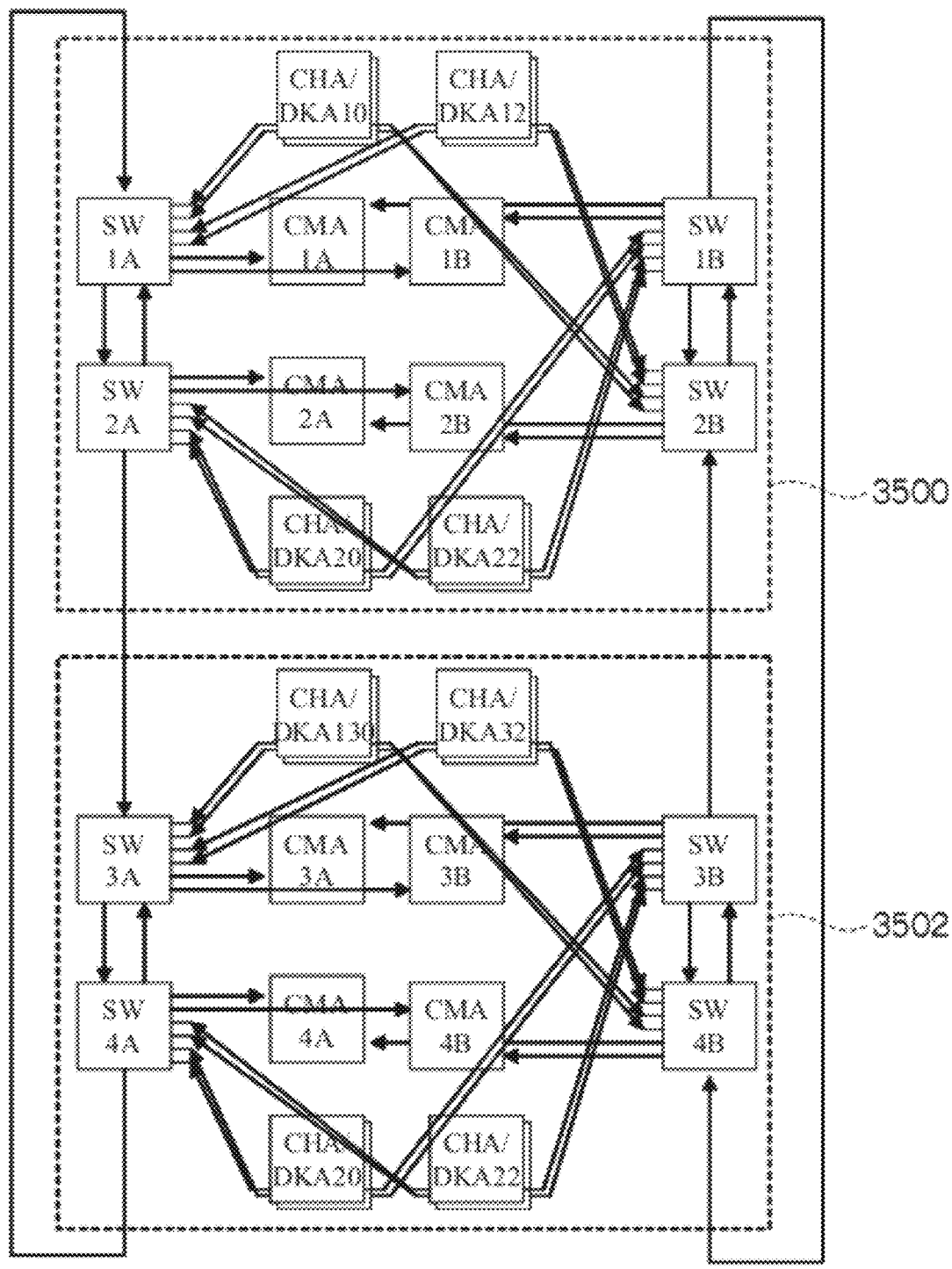
FIG. 45 is a block diagram showing a modified example of duplexing each CHA/DKA in accordance with the duplexed power source.

In FIG. 44, although the CHA/DKA is not duplexed in accordance with the duplexed power sources, each CHA/DKA may also be duplexed according to the duplexed power sources as shown in FIG. 45. According to this configuration, since the CHA/DKA is duplexed as shown with the CHA/DKA 10 and the CHA/DKA 20 regarding the respective power sources, the write data will not be lost in combination with the redundant switches and CMAs. The redundant power sources are omitted in FIG. 45 to FIG. 48 for the sake of convenience.

Figure 46:
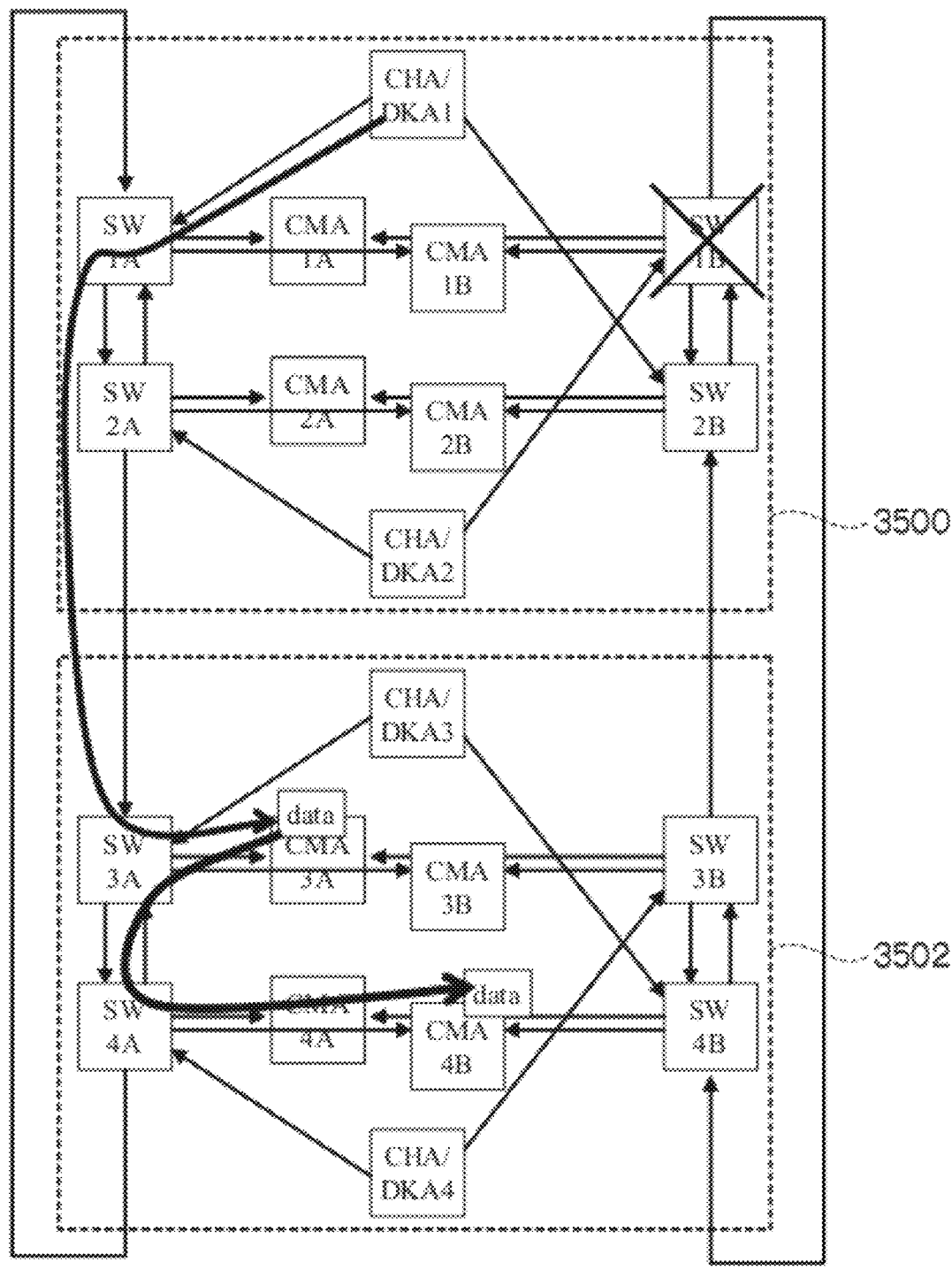
FIG. 46 is a block diagram explaining the operation of an embodiment pertaining to FIG. 44.

The characteristic operation of FIG. 44 is now explained with reference to FIG. 46. In the storage subsystem pertaining to FIG. 46 (the two adjacent modules in FIG. 35 and FIG. 46 are illustrated as symbolic illustrations of the storage subsystem), the write data sent from the CHA/DKA 1 to the CMA 4 is not transferred to the CMA 4 by passing through from the SW 1A to the SW 2A and SW 3A at once, but is rather transferred to the CMA 4 upon being temporarily buffered in the CMA 3 in order to prevent the foregoing deadlock. The data storage area of the CMA 4 is a master area (final storage destination of the write data), and the data from this storage area id destaged to a storage medium or storage device (HDD, semiconductor memory such as a flash memory, magnetic tape, optical disk or the like).

The object to be temporarily stored in the cache memory is a packet containing data, and temporarily buffering is not necessarily required since portions other than the data of the packet can be recreated.

In FIG. 46, when the CHA/DKA 4 stores data from the SW 4A into the master area of the CMA 4, it stored the data in duplicate in the CMA 4A and the CMA 4B. The storage subsystem thereafter reports the completion of writing to the host system at the time data is stored in the CMA 4A and the CMA 4B in duplicated.

This is because the CMA 4A and the CMA 4B are respectively supplied power from separate power sources, and the write data will not be lost under normal circumstances. Like this, since it is possible to report the completion of writing to the host system before the storage subsystem stores the data in the HDD, the load on the storage subsystem pertaining to the packet processing of the write command from the host system can be alleviated.

Figure 47:
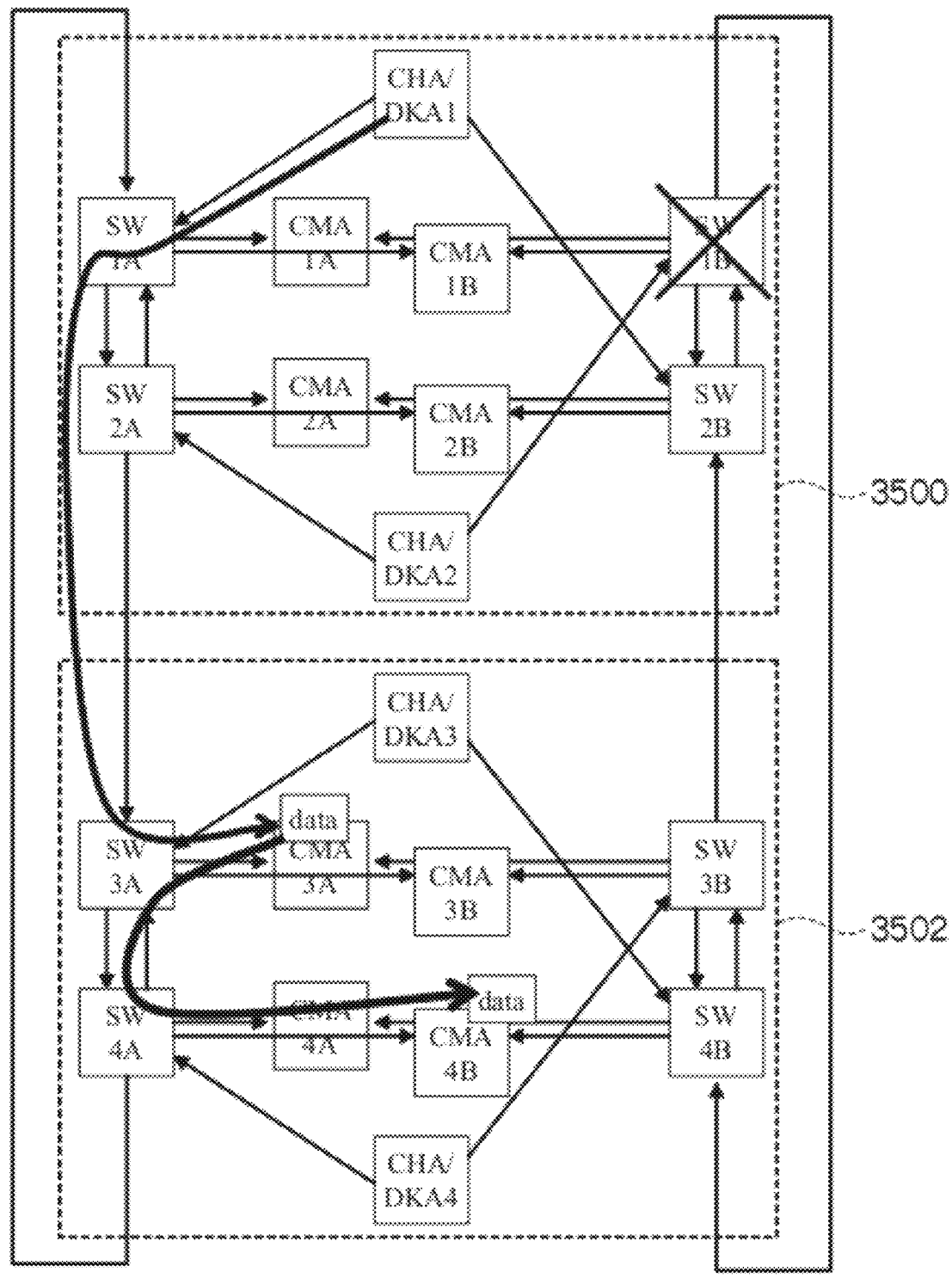
FIG. 47 is a block diagram pertaining to a modified example of FIG. 46.

FIG. 47 is a modified example of FIG. 46. In FIG. 46, the module 3502 issues a write completion report to the host computer that the time write data is stored in the CMA 4A and the CMA 4B in duplicate. Meanwhile, in FIG. 47, the write data storage area of the CMA 3A, which is a temporary storage area, is upgraded to an official master area without being invalidated, the write data is stored in the master area of the CMA 4B, and at this point in time the module 3502 issues a write completion report to the host system. This is because, as a result of storing one storage area of the CMA 3A in the master area, the write data will also be stored in the master area of the CMA 4B in duplicate. Since the CMA 3A is supplied the power source of the A system and the CMA 4B is supplied the power source of the B system, redundancy against power source failure is also achieved.

Figure 48:
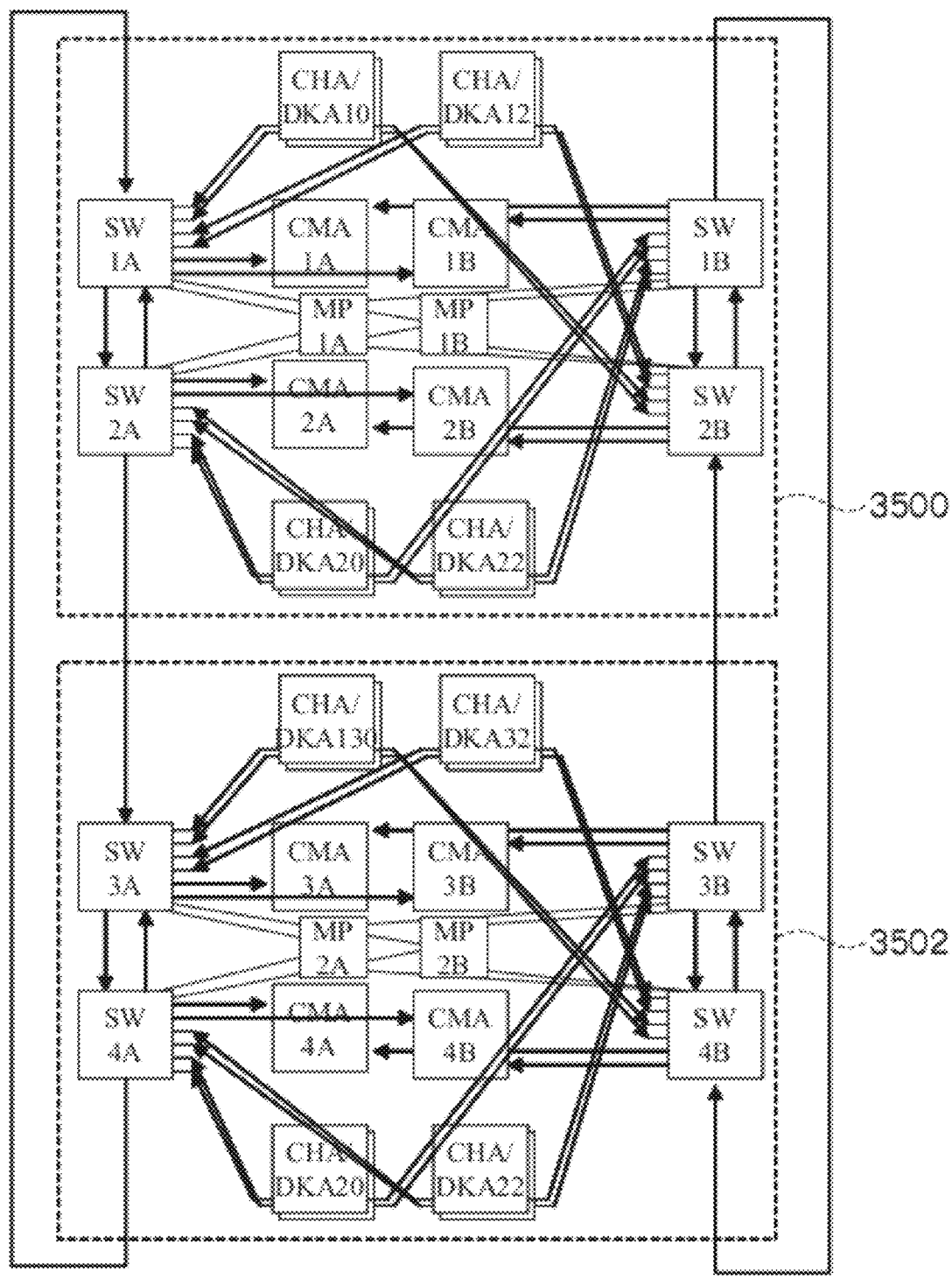
FIG. 48 is a block diagram pertaining to an embodiment in which the MP function is not doubled by the CHA/DKA.

FIG. 48 is a block diagram pertaining to an embodiment in which the MP function is not doubled by the CHA/DKA. The MP is duplexed as the A system (for instance MP 1A) to which power is supplied from the power source A and as the B system (for instance MP 1B) to which is power is supplied from the power source B in the respective modules. Each MP is connected to all switches (SW 1A, SW 2A, SW 1B, SW 2B).

Since the control information handled by the MP is of a short data length, the path between the MP and the switch may have a narrower bandwidth than the path that connects the CMA and CHA/DKA that transfers I/O data with the host system and the respective switches. It will be relatively easy to increase the number of paths between the respective switches and the MP. As a result of forming a path from the MP in the four switches in the module, it will not be necessary to perform the foregoing redirect in the transfer of messages between the MPs. For example, (4) and (6) will not end in relation to FIG. 29, and the MP 2 can transfer a message to the MP 0 with one hop.

Figure 49:
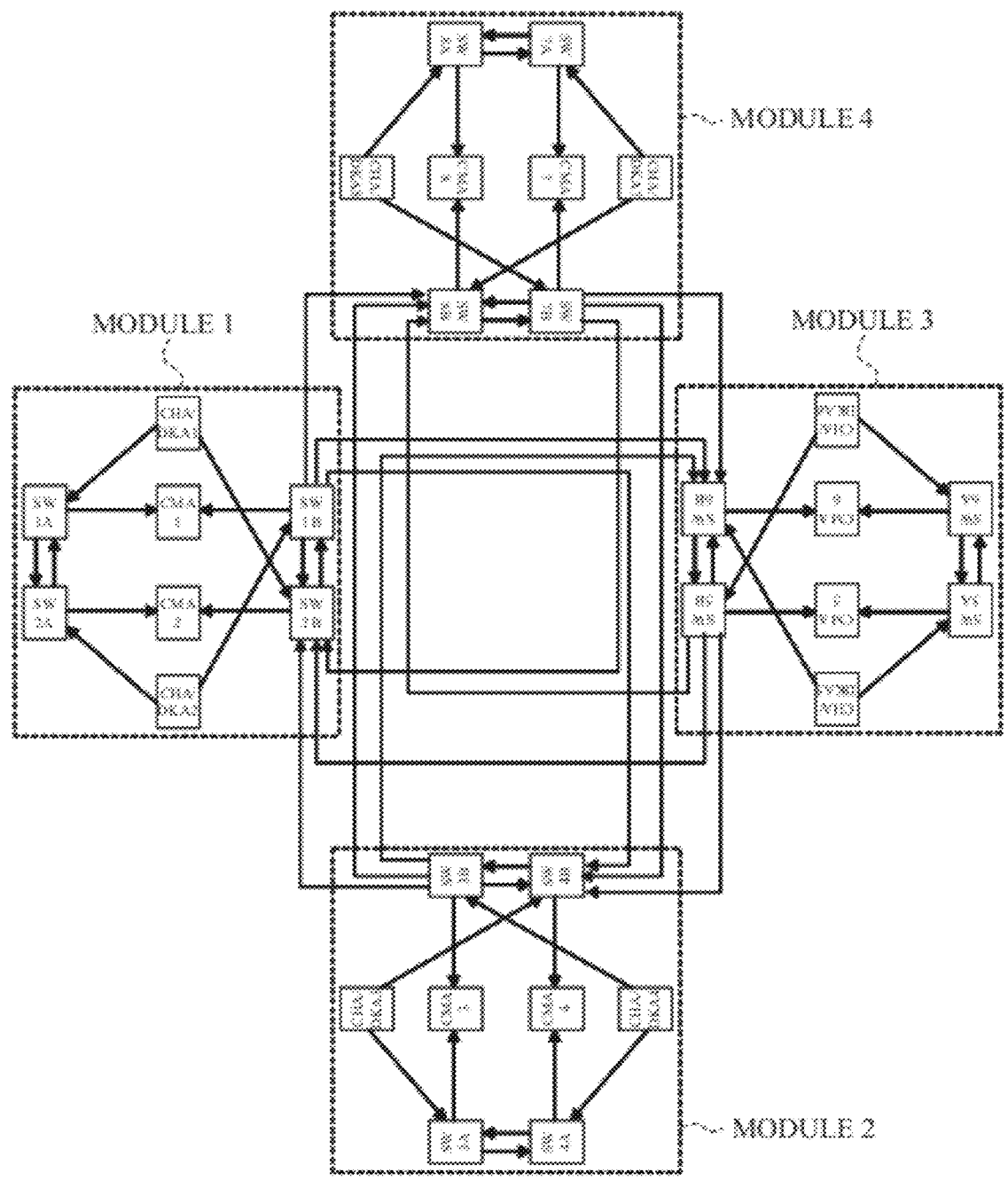
FIG. 49 is a block diagram showing the relevant parts of a grid system obtained by mutually interconnecting a plurality of modules of the storage subsystem illustrated in FIG. 35 into a mesh shape.

FIG. 49 is a block diagram showing the relevant parts of a grid system obtained by mutually interconnecting a plurality of modules of the storage subsystem illustrated in FIG. 35 into a mesh shape. When focusing on the module 1, the module 1 is mutually connected to the three adjacent modules via the switch of the B system. Paths are formed in the switch 2B of the module 1 so that the three command packets of the other three adjacent modules can be received respectively, and paths are formed so that command packets can be respectively sent from the switch 1B of the module 1 to the other three adjacent modules.

What is claimed is:

1. A storage system comprising:
a plurality of channel adapters coupled to a host computer;
a plurality of switches each coupled to another one of the plurality of switches by a plurality of paths, and each switch including for each path a send buffer and a receive buffer;
a plurality of cache memory adapters; and
a controller having a memory which stores a transfer rule for transferring a packet among the channel adapters, the switches, and the cache memory adapters, and controlling the transfer of the packet in accordance with the transfer rule;
wherein a first path connects between a first switch and a second switch, and a second path connects between the first switch and the second switch,
wherein the packet is one of a command packet and a reply packet, and
wherein the transfer rule regulates a transfer direction of each of the paths to be one way and specifies that the command packet transfer direction of the first path and the command packet transfer direction of the second path are opposite directions, and that a reply packet is transferred in a direction opposite to the transfer direction of a command path along the path on which the command packet was transferred.

2. The storage system according to claim 1, wherein the cache memory adapter receives the command packet, executes a proceeding in accordance with the command packet, and transmits the reply packet.

3. The storage system according to claim 2, wherein the cache memory adapter couples to a storage device, and
wherein the proceeding is one of reading data or writing data to the storage device.

4. The storage system according to claim 3, wherein each of said paths connects between a source switch and a destination switch and comprises a send buffer of the source switch, a receive buffer of the source switch, a send buffer of the destination switch, and a receive buffer of the destination switch.

5. The storage system according to claim 4, further comprising a cache memory, and
wherein the transfer rule regulates a number of packet hops.

6. The storage system according to claim 5, wherein the transfer rule comprises the number of packet hops, an identifier of the source switch for switching of a packet, and an identifier of the destination switch for switching of the packet.

* * * * *